United States Patent Office 3,186,988
Patented June 1, 1965

3,186,988
19-HALO PREGNANE DERIVATIVES
Albert Bowers, Mexico City, Mexico, assignor to Syntex Corporation, Panama, Panama, a corporation of Panama
No Drawing. Filed Dec. 6, 1963, Ser. No. 328,474
Claims priority, application Mexico, Feb. 19, 1962, 66,216
20 Claims. (Cl. 260—239.55)

The present application is a continuation-in-part of my U.S. patent applications Serial Nos. 194,714, filed May 14, 1962, and 262,237, filed March 1, 1963, now abandoned.

The present invention relates to novel cyclopentanophenanthrene compounds and to a process for the production thereof.

More particularly the present invention relates to novel 19-halo-$\Delta^4$-pregnene-3,20-dione derivatives and to the corresponding 10α-derivatives thereof.

The novel compounds of the present invention are represented by the following formulae:

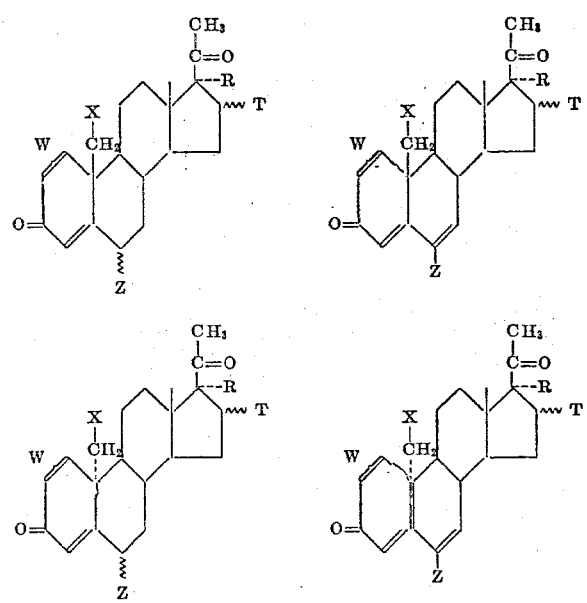

In the above formulae R represents hydrogen, hydroxy or a hydrocarbon carboxylic acyloxy group of less than 12 carbon atoms; T represents hydrogen, α-hydroxy, α-acyloxy, α-methyl or β-methyl; T and R together represent the group

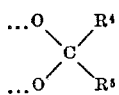

in the 16α,17α-position, wherein $R^4$ and $R^5$ each represent hydrogen or a lower hydrocarbon residue of up to 8 carbon atoms, which may be saturated or unsaturated, of straight branched, cyclic or mixed aliphatic cyclic chain, or aromatic, such as methyl, ethyl, isopropyl, phenyl, toluyl, methyl-cyclohexyl and the like; X represents fluorine or chlorine; Z represents hydrogen, methyl, fluorine or chlorine, all having α or β configuration; and W represents a double bond or a saturated linkage between C–1 and C–2.

The acyl groups are derived from hydrocarbon carboxylic acids containing less than 12 carbon atoms which may be saturated or unsaturated, of straight, branched, cyclic or cyclic aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by the above formulae are powerful progestational agents with good oral activity. In addition, they have anti-androgenic, anti-gonadotrophic and anti-estrogenic properties, are very useful in fertility control and are devoid of androgenic activity. Furthermore, they may be used in the treatment of premenstrual tension and exhibit blood cholesterol lowering and diuretic activities. When applied topically, these compounds are very useful in the treatment of acne.

The novel compounds of the present invention are prepared by the process illustrated by the following equation:

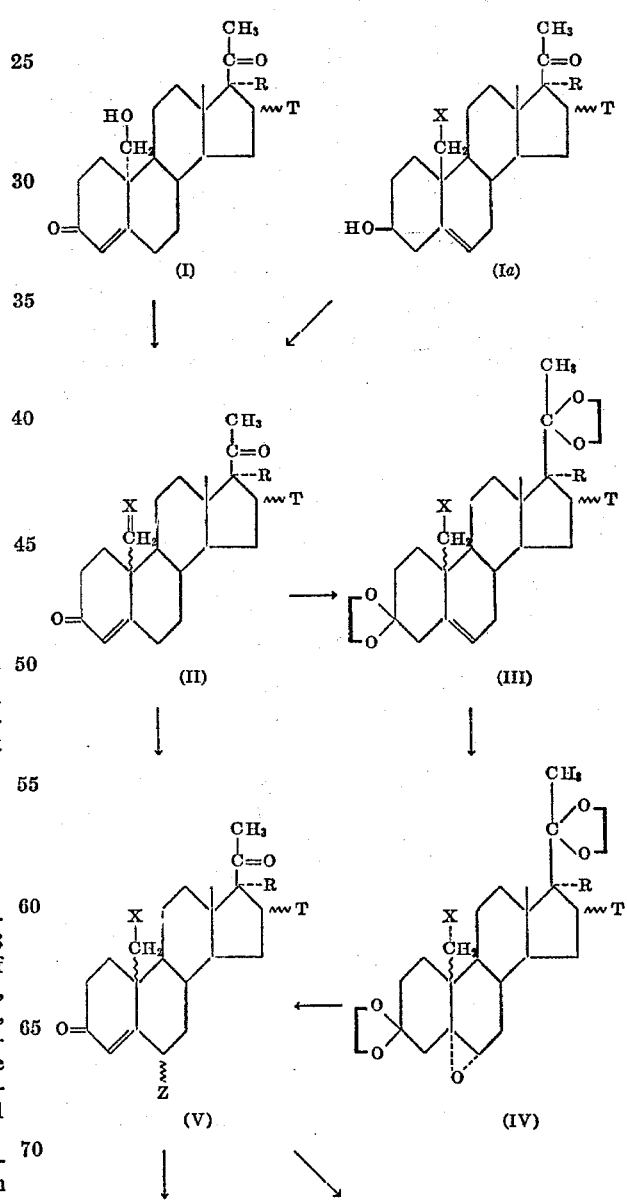

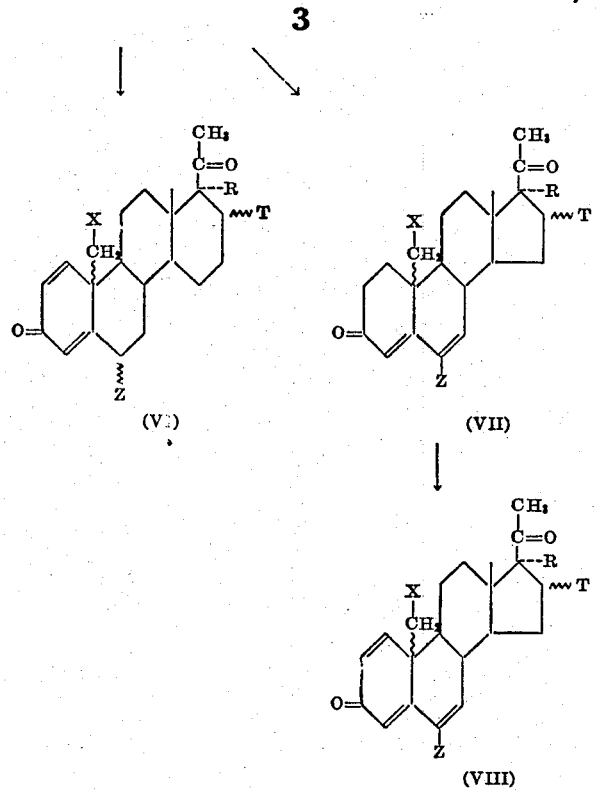

In the above formulae R, T, X and Z have the same meaning as previously described; R' represents hydrogen or a hydrocarbon carboxylic acyloxy group of less than 12 carbon atoms; T' may be hydrogen, α-acyloxy, α-methyl or β-methyl; T' and R' together represent the group

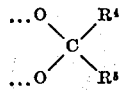

wherein $R^4$ and $R^5$ have the same meaning as set forth hereinbefore; and ξ indicates that the 19-carbon may be at α- or β-configuration.

The starting compounds of the present process represented by Formula I, which is a $\Delta^4$-10α-pregnen-19-ol-3,20-dione derivative, is obtained according to Cross, U.S. patent application Serial No. 231,831, filed October 19, 1962, from the corresponding $\Delta^4$-pregnen-19-ol-3,20-dione, by hydrogenation of the $\Delta^4$-double bond, tosylation of the resulting allopregnan-19-ol-3,20-dione treatment of the obtained 19-tosylate with sodium hydride, hydrolysis of the resulting 2,19-cyclo-allopregnane-3,20-dione in a strong acid or basic medium and finally introduction of a $\Delta^4$-double bond into the obtained 10α-allopregnan-19-ol-3,20-dione by conventional procedures, i.e. successive treatment with bromine, sodium iodide and γ-collidine.

The starting compound of the present process represented by formula Ia, which is a 19-halo-$\Delta^5$-pregnen-3β-ol-20-one is obtained in accordance with my U.S. patent application Serial No. 194,717, filed May 14, 1962, by treating the corresponding $\Delta^5$-pregnene-3β,19-diol-20-one 3-acetate with a fluorinating agent such as 2-chloro-1,1,2-trifluorotriethylamine or with tosyl chloride followed by a lithium halide and, thereafter, by saponification with a base such as aqueous methanolic potassium hydroxide.

In carrying out the process just outlined, the starting compound of the type represented by Formula I is treated with approximately 1 molar equivalent of tosyl chloride in pyridine, thus giving the corresponding 19-tosylate, which upon treatment with an alkali metal fluoride or chloride, such as lithium fluoride or chloride, yields the corresponding 19-fluoro or chloro-$\Delta^4$-10α-pregnene-3,20-dione (II; ξ=α).

When starting with a compound of the type represented by formula Ia, the latter is treated under conventional Oppenauer conditions to produce the corresponding 19-halo-$\Delta^4$-pregnene-3,20-dione (II; ξ=β).

The 19-halo-$\Delta^4$-pregnene-3,20-dione derivative (II) having either 10α or 10β configuration upon reaction with ethylene glycol in the presence of p-toluenesulfonic acid yields the corresponding 3,20-bis-cycloethylenedioxy-19-halo-$\Delta^5$-pregnene derivatives (III).

The latter compound upon treatment with an organic peracid, such as monoperphthalic acid in an inert solvent, preferably chloroform, yields the corresponding 3,20-bis-cycloethylenedioxy-5α,6α-oxido-19-halo-pregnane (IV).

Upon reaction of the latter 3,20-bis-cycloethylenedioxy-5α,6α-oxido compound with methyl magnesium bromide in an inert solvent, such as ether of tetrahydrofuran, followed by conventional working up and treatment of the residue with a mineral acid, such as 8% sulfuric acid, and thereafter with an alkali metal hydroxide, such as sodium hydroxide, there is obtained the corresponding 19-halo-6α-methyl-$\Delta^4$-pregnene-3,20-dione derivative (V: Z=α-methyl).

When treating the 3,20-bis-cycloethylenedioxy-5α,6α-oxido compounds (IV) with anhydrous hydrogen chloride in a suitable solvent, such as ethyl acetate, there are produced the corresponding 6α-chloro-19-halo-$\Delta^4$-pregnene-3,20-dione derivatives (V: Z=α-chlorine).

Upon reaction of the 3,20-bis-cycloethylenedioxy-5α,6α-oxido compounds (IV) with anhydrous hydrogen fluoride in the presence of boron trifluoride etherate, followed by treatment with hydrogen chloride, there are produced the corresponding 6α-fluoro-19-halo-$\Delta^4$-pregnene-3,20-dione derivatives (V: Z=α-fluorine).

Upon treating a 3,20-bis-cycloethylenedioxy-5α,6α-oxido derivative (IV) with methyl magnesium bromide in an inert solvent, such as ether or tetrahydrofuran, the resulting steroid reacted with 8% sulfuric acid and worked up conventionally, thereaftertreated with thionyl chloride in pyridine at about −10° C., for approximately 4 minutes, thus affording the corresponding 19-halo-6β-methyl-$\Delta^4$-pregnene-3,20-dione derivative (V: Z=β-methyl).

The 19-halo-$\Delta^4$-pregnene-3,20-dione derivatives (II) are treated with ethyl orthoformate in the presence of p-toluenesulfonic acid and in an inert solvent, thus affording the corresponding 19-halo-3-ethoxy-$\Delta^{3,5}$-pregnadien-20-one derivatives which upon reaction with approximately 1 molar equivalent of N-chloro-succinimide or another N-chloro amide or imide, in the presence of sodium acetate and acetic acid, yield the corresponding 6β-chloro-19-halo-$\Delta^4$-pregnene-3,20-dione (V: Z=β-chlorine).

The aforementioned 19-halo-3-ethoxy-$\Delta^{3,5}$-pregnadien-20-one derivatives are treated with perchloryl fluoride in dimethylformamide to produce the corresponding 6β-fluoro-19-halo-$\Delta^4$-pregnene-3,20-dione derivatives (V: Z=β-fluorine).

The 6α-halo compounds of the present invention (V: Z=α-halogen) may also be obtained by treatment of the corresponding 6β-halo compounds (V: Z=β-halogen) with hydrogen-chloride in acetic acid, or with any other mixture with similar acidity.

The 19-halo-$\Delta^4$-pregnene-3,20-dione derivatives (V) are treated with 2,3-dichloro-5,6-dicyano-1,4-benzoquinone in an inert solvent, such as dioxane, preferably at reflux temperature, for a period of time of the order of 10 hours to produce the corresponding 19-halo-$\Delta^{1,4}$-pregnadiene-3,20-dione compounds (VI).

The 19-halo-$\Delta^4$-pregnene-3,20-dione derivatives (V) upon treatment with ethyl orthoformate in an inert solvent and in the presence of p-toluenesulfonic acid furnish the corresponding 19-halo-3-ethoxy-$\Delta^{3,5}$-pregnadiene derivatives, which are treated with approximately 1 molar equivalent of 2,3-dichloro-5,6-dicyano-1,4-benzoquinone, in the presence of a catalytic amount of acid and in an inert solvent, to give the corresponding 19-halo-Δ⁴,⁶-pregnadiene-3,20-dione derivatives (VII). The latter Δ⁴,⁶-compounds may be converted into the corresponding Δ¹,⁴,⁶-derivatives (VIII) by further treatment with 2,3-dichloro-5,6-dicyano-1,4-benzoquinone under the conditions specified hereinbefore for the production of the Δ¹,⁴-derivatives (VI).

The compounds of the present invention having a 16α,17α-ketonide grouping, yield the corresponding 16α,17α-diols, by conventional treatment with a strong acid such as formic acid. The obtained diols, upon conventional esterification in pyridine with an acylating agent, as for example acetic anhydride or caproic anhydride afford the corresponding 16-acylates.

The latter 16α,17α-diols upon conventional condensation with a ketonide or aldehyde, such as benzaldehyde, acetophenone, methylethyl ketone, acetone, and the like, in the presence of an acid, yield the corresponding 16α,17α-methylenedioxy derivatives, wherein the substituents in the methylenedioxy group may be different from those of the previously hydrolyzed ketonide grouping.

The compounds of the present invention having a hydroxyl group at C–17α, may be acylated by conventional treatment with an acylating agent, such as an anhydride derived from a hydrocarbon carboxylic acid of the type described hereinbefore, in the presence of p-toluenesulfonic acid, to produce the corresponding 17α-esters.

The following specific examples serve to illustrate the present invention, but are not intended to limit the scope thereof:

PREPARATION 1

To a solution of 5 g. of 19-fluoro-Δ⁵-pregnene-3β,17α-diol-20-one (obtained in accordance with my U.S. patent application Serial No. 194,717, filed May 14, 1962, now U.S. Patent No. 3,124,574) in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis on the excess anhydride. The benzene layer was separated and washed with 10% sodium carbonate solution and water. Drying, evaporation and crystallization of the residue from ether-hexane produced 19-fluoro-Δ⁵-pregnene-3β,17α-diol-20-one diacetate.

A suspension of 1 g. of the latter diacetate in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 19-fluoro-Δ⁵-pregnene-3β,17α-diol-20-one 17-acetate.

By the same procedure, the starting compounds under A (obtained in accordance with the aforesaid patent application) were converted into the products under B.

| A | B |
|---|---|
| 19-fluoro-16α-methyl-Δ⁵-pregnene-3β,17α-diol-20-one. | 19-fluoro-16α-methyl-Δ⁵-pregnene-3β,17α-diol-20-one 17-acetate. |
| 19-fluoro-16β-methyl-Δ⁵-pregnene-3β,17α-diol-20-one. | 19-fluoro-16β-methyl-Δ⁵-pregnene-3β,17α-diol-20-one 17-acetate. |
| 19-chloro-Δ⁵-pregnene-3β,17α-diol-20-one. | 19-chloro-Δ⁵-pregnene-3β,17α-diol-20-one 17-acetate. |
| 19-chloro-16α-methyl-Δ⁵-pregnene-3β,17α-diol-20-one. | 19-chloro-16α-methyl-Δ⁵-pregnene-3β,17α-diol-20-one 17-acetate. |
| 19-chloro-16β-methyl-Δ⁵-pregnene-3β,17α-diol-20-one. | 19-chloro-16β-methyl-Δ⁵-pregnene-3β,17α-diol-20-one 17-acetate. |

PREPARATION 2

5 g. of 16β-methyl-Δ⁴-pregnene-17α,19-diol-3,20-dione 17-acetate (obtained according to my copending U.S. patent application Ser. No. 201,797, filed June 12, 1962, now abandoned, from the corresponding Δ⁵-3β-alcohol by selective Oppenauer oxidation of the latter moiety (10 minutes)) dissolved in 250 cc. of ethyl acetate was hydrogenated overnight in the presence of 0.5 g. of a 5% palladium on charcoal catalyst at atmospheric pressure and room temperature. Removal of catalyst and solvent and crystallization of the residue from acetone furnished 16β-methyl-allopregnane-17α,19-diol-3,20-dione 17-acetate.

A solution of 5 g. of the latter compound in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained 16β-methyl-allopregnane-17α,19-diol-3,20-dione 17-acetate-19-tosylate.

One gram of the latter tosylate was dissolved in 30 cc. of toluene and thereto was added 1 g. of sodium hydride suspended in mineral oil. The resulting mixture was refluxed for 5 hours. Then, 5 cc. of t-butanol were cautiously added to decompose the excess of hydride, and the whole was washed with water, dried and evaporated to dryness. Alumina chromatography of the residue, followed by recrystallization from acetone-hexane yielded 16β-methyl-2,19-cyclo-allopregnan-17α-ol-3,20-dione.

A solution of 1 g. of the latter 2,19-cyclo compound in 50 cc. of ethanol was treated with 50 cc. of 70% sulfuric acid and kept for 5 hours on the steam bath. It was then poured into water and extracted with methylene chloride. The extract was successively washed with water, sodium bicarbonate solution and water. Thereafter it was dried over sodium sulfate and evaporated to dryness. The residue was chromatographed on alumina, thus affording 16β-methyl-10α-allopregnane-17α,19-diol-3,20-dione.

A solution of 2 mol equivalents of bromine in 15 cc. of glacial acetic acid was added dropwise to a solution of 1 g. of the latter dione, in 25 cc. of acetic acid containing a few drops of 4 N hydrogen bromide in acetic acid. After five hours at room temperature, the mixture was poured into ice water and the precipitated dibromo derivative was collected, washed well with water, and dried. The dried material was refluxed for 14 hours with 2 g. of sodium iodide in 40 cc. of ethyl methyl ketone and then kept at room temperature for an additional 12 hours. After dilution with water, the product was extracted with ether, washed with sodium thiosulfate solution and water, and the ether was removed under reduced pressure.

The crude residue was refluxed for 30 minutes with 10 cc. of γ-collidine. The solution was cooled, the precipitate removed and the filtrate was diluted with ether, washed with dilute hydrochloric acid, sodium bicarbonate solution and water. The dried extract was evaporated and the residue was recrystallized from ether-hexane affording 16β-methyl-Δ⁴-10α-pregnene-17α,19-diol-3,20-dione.

Example 1

A solution of 1 g. of 19-fluoro-Δ⁵-pregnen-3β-ol-20-one (obtained in accordance with my U.S. patent application Serial No. 194,717, filed May 14, 1962, now U.S. Patent No. 3,124,574), in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded Compound No. 1, namely 19-fluoro-Δ⁴-pregnene-3,20-dione.

When applying the above procedure to the starting compounds under A (obtained in accordance with the aforesaid patent application) there were obtained the corresponding products under B.

| A | Cpd. No. | B |
|---|---|---|
| 19-fluoro-16α-methyl-Δ⁵-pregnen-3β-ol-20-one. | 2 | 19-fluoro-16α-methyl-Δ⁴-pregnene-3,20-dione. |
| 19-fluoro-16β-methyl-Δ⁵-pregnen-3β-ol-20-one. | 3 | 19-fluoro-16β-methyl-Δ⁴-pregnene-3,20-dione. |
| 19-fluoro-16α,17α-isopropylidenedioxy-Δ⁵-pregnen-3β-ol-20-one. | 4 | 19-fluoro-16α,17α-isopropylidenedioxy-Δ⁴-pregnene-3,20-dione. |

19-fluoro-Δ⁵-pregnene-3β,17α - diol - 20-one-17-acetate (obtained in accordance with Preparation 1) was treated in accordance with the same procedure thus affording 19-fluoro-Δ⁴-pregnen-17α-ol-3,20-dione acetate.

A solution of 0.17 g. of potassium hydroxide in 0.2 cc. of water and 2.5 cc. of methanol was added over 30 minutes to a boiling solution of 1 g. of the latter 3,20-diketo acetate, in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 19-fluoro-Δ⁴-pregnen-17α-ol-3,20-dione (Cpd. No. 5).

19-fluoro-16α-methyl-Δ⁵-pregnene-3β,17α - diol-20-one 17-acetate and 19-fluoro-16β-methyl-Δ⁵-pregnene-3β,17α-diol-20-one 17-acetate (obtained according to Preparation 1) were treated by the same procedures as the corresponding 16-desmethyl compound, thus affording respectively 19-fluoro-16α-methyl-Δ⁴ - pregnen - 17α-ol-3,20 - dione (Cpd. No. 6) and 19-fluoro-16β-methyl-Δ⁴-pregnen-17α-ol-3,20-dione (Cpd. No. 7).

The 19-chloro compounds listed under C (obtained in accordance with the aforementioned patent application or with Preparation No. 1) were treated following the procedures described for the corresponding 19-fluoro compounds, thus affording the products under D.

| C | Cpd. No. | D |
|---|---|---|
| 19-chloro-Δ⁴-pregnen-3β-ol-20-one. | 8 | 19-chloro-Δ⁴-pregnen-3,20-dione. |
| 19-chloro-16α-methyl-Δ⁵-pregnen-3β-ol-20-one. | 9 | 19-chloro-16α-methyl-Δ⁴-pregnene-3,20-dione. |
| 19-chloro-16β-methyl-Δ⁵-pregnen-3β-ol-20-one. | 10 | 19-chloro-16β-methyl-Δ⁴-pregnene-3,20-dione. |
| 19-chloro-16α,17α-isopropylidenedioxy-Δ⁵-pregnen-3β-ol-20-one. | 11 | 19-chloro-16α,17α-isopropylidenedioxy-Δ⁴-pregnene-3,20-dione. |
| 19-chloro-Δ⁵-pregnene-3β,17α-diol-20-one 17-acetate. | 12 | 19-chloro-Δ⁴-pregnene-17α-ol-3,20-dione. |
| 19-chloro-16α-methyl-Δ⁵-pregnene-3β,17α-diol-20-one 17-acetate. | 13 | 19-chloro-16α-methyl-Δ⁴-pregnen-17α-ol-3,20-dione. |
| 19-chloro-16β-methyl-Δ⁵-pregnene-3β,17α-diol-20-one 17-acetate. | 14 | 19-chloro-16β-methyl-Δ⁴-pregnen-17α-ol-3,20-dione. |

*Example II*

A mixture of 5 g. of 19-fluoro-Δ⁴-pregnene-3,20-dione (Cpd. No. 1), 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3,20-bis-cycloethylenedioxy-19-fluoro-Δ⁵-pregnene (Cpd. No. 15).

The Compounds Nos. 2 to 14, inclusive, obtained according to Example I, were treated following the same procedure, thus affording respectively—
Cpd. No.:

16. 3,20-bis-cycloethylenedioxy-19-fluoro-16α-methyl-Δ⁵-pregnene
17. 3,20-bis-cycloethylenedioxy-19-fluoro-16β-methyl-Δ⁵-pregnene
18. 3,20-bis-cycloethylenedioxy-19-fluoro-16α,17α-isopropylidenedioxy-Δ⁵-pregnene
19. 3,20-bis-cycloethylenedioxy-19-fluoro-Δ⁵-pregnen-17α-ol
20. 3,20-bis-cycloethylenedioxy-19-fluoro-16α-methyl-Δ⁵-pregnene-17α-ol
21. 3,20-bis-cycloethylenedioxy-19-fluoro-16β-methyl-Δ⁵-pregnen-17α-ol
22. 3,20-bis-cycloethylenedioxy-19-chloro-Δ⁵-pregnene
23. 3,20-bis-cycloethylenedioxy-19-chloro-16α-methyl-Δ⁵-pregnene
24. 3,20-bis-cycloethylenedioxy-19-chloro-16β-methyl-Δ⁵-pregnene
25. 3,20-bis-cycloethylenedioxy-19-chloro-16α,17α-isopropylidenedioxy-Δ⁵-pregnene
26. 3,20-bis-cycloethylenedioxy-19-chloro-Δ⁵-pregnen-17α-ol
27. 3,20-bis-cycloethylenedioxy-19-chloro-16α-methyl-Δ⁵-pregnen-17α-ol
28. 3,20-bis-cycloethylenedioxy-19-chloro-16β-methyl-Δ⁵-pregnen-17α-ol

*Example III*

A solution of 2.5 g. of 3,20-bis-cycloethylenedioxy-19-fluoro-Δ⁵-pregnene (Cpd. No. 15), in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 3,20 - bis-cycloethylenedioxy-5α,6α-oxido-19-fluoro-pregnane (Cpd. No. 29).

When applying the above procedure to the Compounds Nos. 16 to 28 inclusive, there were obtained respectively—

Cpd. No.:

30. 3,20-bis-cycloethylenedioxy-5α,6α-oxido-19-fluoro-16α-methyl-pregnane
31. 3,20-bis-cycloethylenedioxy-5α,6α-oxido-19-fluoro-16β-methyl-pregnane
32. 3,20-bis-cycloethylenedioxy-5α,6α-oxido-19-fluoro-16α,17α-isopropylidenedioxy-pregnane
33. 3,20-bis-cycloethylenedioxy-5α,6α-oxido-19-fluoro-pregnan-17α-ol
34. 3,20-bis-cycloethylenedioxy-5α,6α-oxido-19-fluoro-16α-methyl-pregnan-17α-ol
35. 3,20-bis-cycloethylenedioxy-5α,6α-oxido-19-fluoro-16β-methyl-pregnan-17α-ol
36. 3,20-bis-cycloethylenedioxy-5α,6α-oxido-19-chloro-pregnane
37. 3,20-bis-cycloethylenedioxy-5α,6α-oxido-19-chloro-16α-methyl-pregnane
38. 3,20-bis-cycloethylenedioxy-5α,6α-oxido-19-chloro-16β-methyl-pregnane
39. 3,20-bis-cycloethylenedioxy-5α,6α-oxido-19-chloro-16α,17α-isopropylidenedioxy-pregnane
40. 3,20-bis-cycloethylenedioxy-5α,6α-oxido-19-chloro-pregnan-17α-ol
41. 3,20-bis-cycloethylenedioxy-5α,6α-oxido-19-chloro-16α-methyl-pregnan-17α-ol
42. 3,20-bis-cycloethylenedioxy-5α,6α-oxido-19-chloro-16β-methyl-pregnan-17α-ol

*Example IV*

To a solution of 40 cc. of 4 N methylmagnesium bromide in ether was added, with stirring, a solution of 2 g. of 3,20-bis-cycloethylenedioxy-5α,6α-oxido - 19 - fluoropregnane (Cpd. No. 29) in 60 cc. of dry tetrahydrofuran and the stirred mixture heated under reflux for 30 minutes. The condenser was then replaced by a calcium chloride tube, the ether allowed to boil off and when the internal temperature reached 54° C., the condenser was readadapted and the mixture refluxed for an additional 4 hours. 400 cc. of a saturated solution of ammonium chloride was added slowly to the cooled mixture which was then stirred for 15 minutes before transfer to a separatory funnel. The tetrahydrofuran layer was separated, dried and evaporated to dryness, thus affording a solid residue.

A solution of the above residue in 70 cc. of methanol and 7 cc. of 8% aqueous sulfuric acid was refluxed for 40 minutes. It was then neutralized with saturated sodium carbonate solution, concentrated to ca. 20 cc. in vacuo and poured into water. The formed precipitate was filtered off and washed thoroughly with water and air dried.

A solution of the dry precipitate in 100 cc. of methanol and 50 cc. of 1 N aqueous sodium hydroxide was allowed to stand at room temperature under a nitrogen atmosphere for 24 hours. The solution was then concentrated under reduced pressure and without heating to half its volume, ice water was added and the crystalline precipitate filtered, washed and dried. Recrystallization from aqueous acetone gave 19-fluoro-6α-methyl-$\Delta^4$-pregnene-3,20-dione (Cpd. No. 43).

The Compounds Nos. 30 to 42, inclusive, were treated by the above method, furnishing respectively—

Cpd. No.:
44. 19-fluoro-6α,16α-dimethyl-$\Delta^4$-pregnene-3,20-dione
45. 19-fluoro-6α,16β-dimethyl-$\Delta^4$-pregnene-3,20-dione
46. 19-fluoro-6α-methyl-16α,17α-isopropylidenedioxy-$\Delta^4$-pregnene-3,20-dione
47. 19-fluoro-6α-methyl-$\Delta^4$-pregnen-17α-ol-3,20-dione
48. 19-fluoro-6α,16α-dimethyl-$\Delta^4$-pregnen-17α-ol-3,20-dione
49. 19-fluoro-6α,16β-dimethyl-$\Delta^4$-pregnen-17α-ol-3,20-dione
50. 19-chloro-6α-methyl-$\Delta^4$-pregnene-3,20-dione
51. 19-chloro-6α,16α-dimethyl-$\Delta^4$-pregnene-3,20-dione
52. 19-chloro-6α,16β-dimethyl-$\Delta^5$-pregnene-3,20-dione
53. 19-chloro-6α-methyl-16α,17α-isopropylidenedioxy-$\Delta^4$-pregnene-3,20-dione
54. 19-chloro-6α-methyl-$\Delta^4$-pregnen-17α-ol-3,20-dione
55. 19-chloro-6α,16α-dimethyl-$\Delta^4$-pregnen-17α-ol-3,20-dione
56. 19-chloro-6α,16β-dimethyl-$\Delta^4$-pregnen-17α-ol-3,20-dione

*Example V*

Into a suspension of 1 g. of 3,20-bis-cycloethylenedioxy-5α,6α-oxide-19-fluoro-pregnane (Cpd. No. 29) in 35 cc. of anhydrous ethyl acetate at 10° C. was passed a slow stream of dry hydrochloric acid, after 10 minutes all the solid material was dissolved. The gas was passed through the reaction mixture for a total of 5 hours. The solution was then washed abundantly with water, the organic layer was separated, dried over sodium sulfate and evaporated to dryness. The residue was washed with water to neutrality and dried. Recrystallization from methylene chloride afforded 6α-chloro-19-fluoro-$\Delta^4$-pregnene-3,20-dione (Cpd. No. 57).

By the same procedure, the Compounds Nos. 30 to 42, inclusive, were respectively converted into—

Cpd. No.:
58. 6α-chloro-19-fluoro-16α-methyl-$\Delta^4$-pregnene-3,20-dione
59. 6α-chloro-19-fluoro-16β-methyl-$\Delta^4$-pregnene-3,20-dione
60. 6α-chloro-19-fluoro-16α,17α-isopropylidenedioxy-$\Delta^4$-pregnene-3,20-dione
61. 6α-chloro-19-fluoro-$\Delta^4$-pregnen-17α-ol-3,20-dione
62. 6α-chloro-19-fluoro-16α-methyl-$\Delta^4$-pregnen-17α-ol-3,20-dione
63. 6α-chloro-19-fluoro-16β-methyl-$\Delta^4$-pregnen-17α-ol-3,20-dione
64. 6α,19-dichloro-$\Delta^4$-pregnene-3,20-dione
65. 6α,19-dichloro-16α-methyl-$\Delta^4$-pregnene-3,20-dione
66. 6α,19-dichloro-16β-methyl-$\Delta^4$-pregnene-3,20-dione
67. 6α,19-dichloro-16α,17α-isopropylidenedioxy-$\Delta^4$-pregnene-3,20-dione
68. 6α,19-dichloro-$\Delta^4$-pregnen-17α-ol-3,20-dione
69. 6α,19-dichloro-16α-methyl-$\Delta^4$-pregnen-17α-ol-3,20-dione
70. 6α,19-dichloro-16β-methyl-$\Delta^4$-pregnen-17α-ol-3,20-dione

*Example VI*

2.8 cc. of boron trifluoride etherate was slowly added with stirring to 220 mg. of anhydrous hydrogen fluoride cooled in an acetone-Dry Ice bath.

To a solution of 1 g. of 3,20-bis-cycloethylenedioxy-5α,6α-oxido-19-fluoro-pregnane (Cpd. No. 29) in 10 cc. of a mixture of equal parts of benzene and ether was added 1.3 cc. of the fluoroboric acid reagent. The mixture was kept for 3 hours at room temperature, then washed four times with water, dried over anhydrous sodium sulfate and the solvent evaporated under reduced pressure. The residue was mixed with 35 cc. of anhydrous ethyl acetate and there was passed a slow stream of dry hydrochloric acid. The gas was passed through the reaction mixture for a total of 5 hours. The solution was then washed abundantly with water, the organic layer was separated, dried over sodium sulfate and evaporated to dryness. The residue was washed with water to neutrality and dried. Recrystallization from methylene chloride afforded 6α,19-difluoro-$\Delta^4$-pregnene-3,20-dione (Cpd. No. 71).

When applying the same procedure to the Compounds Nos. 30 to 42, inclusive, there were respectively obtained—

Cpd. No.:
72. 6α,19-difluoro-16α-methyl-$\Delta^4$-pregnene-3,20-dione
73. 6α,19-difluoro-16β-methyl-$\Delta^4$-pregnene-3,20-dione
74. 6α,19-difluoro-16α,17α-isopropylidenedioxy-$\Delta^4$-pregnene-3,20-dione
75. 6α,19-difluoro-$\Delta^4$-pregnen-17α-ol-3,20-dione
76. 6α,19-difluoro-16α-methyl-$\Delta^4$-pregnen-17α-ol-3,20-dione
77. 6α,19-difluoro-16β-methyl-$\Delta^4$-pregnen-17α-ol-3,20-dione
78. 6α-fluoro-19-chloro-$\Delta^4$-pregnene-3,20-dione
79. 6α-fluoro-19-chloro-16α-methyl-$\Delta^4$-pregnene-3,20-dione
80. 6α-fluoro-19-chloro-16β-methyl-$\Delta^4$-pregnene-3,20-dione
81. 6α-fluoro-19-chloro-16α,17α-isopropylidenedioxy-$\Delta^4$-pregnene-3,20-dione
82. 6α-fluoro-19-chloro-$\Delta^4$-pregnen-17α-ol-3,20-dione
83. 6α-fluoro-19-chloro-16α-methyl-$\Delta^4$-pregnen-17α-ol-3,20-dione
84. 6α-fluoro-19-chloro-16β-methyl-$\Delta^4$-pregnen-17α-ol-3,20-dione

*Example VII*

A mixture of 500 mg. of 19-fluoro-6α-methyl-$\Delta^4$-pregnene-3,20-dione (Cpd. No. 43), 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 19-fluoro-6α-methyl-$\Delta^{1,4}$-pregnadiene-3,20-dione (Cpd. No. 85).

The Compounds Nos. 1 to 14, inclusive, were treated following the same procedure, thus affording correspondingly—

Cpd. No:
86. 19-fluoro-$\Delta^{1,4}$-pregnadiene-3,20-dione
87. 19-fluoro-16α-methyl-$\Delta^{1,4}$-pregnadiene-3,20-dione
88. 19-fluoro-16β-methyl-$\Delta^{1,4}$-pregnadiene-3,20-dione
89. 19-fluoro-16α,17α-isopropylidenedioxy-$\Delta^{1,4}$-pregnadiene-3,20-dione
90. 19-fluoro-$\Delta^{1,4}$-pregnadien-17α-ol-3,20-dione
91. 19-fluoro-16α-methyl-$\Delta^{1,4}$-pregnadien-17α-ol-3,20-dione
92. 19-fluoro-16β-methyl-$\Delta^{1,4}$-pregnadien-17α-ol-3,20-dione
93. 19-chloro-$\Delta^{1,4}$-pregnadiene-3,20-dione
94. 19-chloro-16α-methyl-$\Delta^{1,4}$-pregnadiene-3,20-dione
95. 19-chloro-16β-methyl-$\Delta^{1,4}$-pregnadiene-3,20-dione
96. 19-chloro-16α,17α-isopropylidenedioxy-$\Delta^{1,4}$-pregnadiene-3,20-dione
97. 19-chloro-$\Delta^{1,4}$-pregnadien-17α-ol-3,20-dione
98. 19-chloro-16α-methyl-$\Delta^{1,4}$-pregnadien-17α-ol-3,20-dione
99. 19-chloro-16β-methyl-$\Delta^{1,4}$-pregnadien-17α-ol-3,20-dione

Example VIII

When applying the procedure described in the foregoing example to Compounds Nos. 44 to 84, inclusive, there were obtained the corresponding $\Delta^{1,4}$-derivatives.

Example IX

A suspension of 1 g. of 19-fluoro-6α-methyl-$\Delta^4$-pregnene-3,20-dione (Cpd. No. 43), in 7.5 cc. of anhydrous peroxide free dioxane was treated with 1.2 cc. of freshly distilled ethyl orthoformate and 0.8 g. of p-toluene sulfonic acid. The mixture was stirred at room temperature for 15 minutes and the resulting solution let stand for 30 minutes further. 0.8 cc. of pyridine was added and then water. The formed precipitate was collected by filtration, water washed and air dried. Recrystallization from acetonehexane afforded 19-fluoro-6-methyl-3-ethoxy-$\Delta^{3,5}$-pregnadien-20-one.

A solution of 1 g. of the latter compound in 20 cc. of tetrahydrofuran was cooled to 0° C. and there were added 1.05 molar equivalents of 2,3-dichloro-5,6-dicyano 1,4-benzoquinone and 100 mg. of p-toluenesulfonic acid. The resulting mixture was further stirred at 0° C. for 30 minutes. The precipitated hydroquinone was filtered off and 100 cc. of methylene dichloride were added to the filtrate. The organic solution was washed with 5% aqueous sodium hydroxide solution until the washings were colorless, then with water to neutrality, dried over anhydrous sodium sulfate and evaporated to dryness. Crystallization from acetone-hexane gave 19-fluoro-6-methyl-$\Delta^{4,6}$-pregnadiene-3,20-dione (Cpd. No. 100).

The Compounds Nos. 1 to 14, inclusive, were treated following the same procedure, thus affording correspondingly—

Cpd. No.:
101. 19-fluoro-$\Delta^{4,6}$-pregnadiene-3,20-dione
102. 19-fluoro-16α-methyl-$\Delta^{4,6}$-pregnadiene-3,20-dione
103. 19-fluoro-16β-methyl-$\Delta^{4,6}$-pregnadiene-3,20-dione
104. 19-fluoro-16α,17α-isopropylidenedioxy-$\Delta^{4,6}$-pregnadiene-3,20-dione
105. 19-fluoro-$\Delta^{4,6}$-pregnadien-17α-ol-3,20-dione
106. 19-fluoro-16αmethyl-$\Delta^{4,6}$-pregnadien-17α-ol-3,20-dione
107. 19-fluoro-16β-methyl-$\Delta^{4,6}$-pregnadien-17α-ol-3,20-dione
108. 19-chloro-$\Delta^{4,6}$-pregnadiene-3,20-dione
109. 19-chloro-16α-methyl-$\Delta^{4,6}$-pregnadiene-3,20-dione
110. 19-chloro-16β-methyl-$\Delta^{4,6}$-pregnadiene-3,20-dione
111. 19-chloro-16α,17α,isopropylidenedioxy-$\Delta^{4,6}$-pregnadiene-3,20-dione
112. 19-chloro-$\Delta^{4,6}$-pregnadien-17α-ol-3,20-dione
113. 19-chloro-16α-methyl-$\Delta^{4,6}$-pregnadien-17α-ol-3,20-dione
114. 19-chloro-16β-methyl-$\Delta^{4,6}$-pregnadien-17α-ol-3,20-dione

Example X

When applying the procedure described in the foregoing example to Compounds Nos. 44 to 84, inclusive, there were obtained the corresponding $\Delta^{4,6}$-derivatives.

Example XI 19-fluoro-6-methyl-$\Delta^{4,6}$-pregnadiene-3,20-dione (Cpd. No. 100) was treated in accordance with Example VII, thus affording 19-fluoro-6-methyl-$\Delta^{1,4,6}$-pregnatriene-3,20-dione (Cpd. No. 115).

Upon treatment by the same procedure of compounds Nos. 101 to 114 inclusive, there were respectively produced—

Cpd. No.:
116. 19-fluoro-$\Delta^{1,4,6}$-pregnatriene-3,20-dione
117. 19-fluoro-16α-methyl-$\Delta^{1,4,6}$-pregnatriene-3,20-dione
118. 19-fluoro-16β-methyl-$\Delta^{1,4,6}$-pregnatriene-3,20-dione
119. 19-fluoro-16α,17α-isopropylidenedioxy-$\Delta^{1,4,6}$-pregnatriene-3,20-dione
120. 19-fluoro-$\Delta^{1,4,6}$-pregnatrien-17α-ol-3,20-dione
121. 19-fluoro-16α-methyl-$\Delta^{1,4,6}$-pregnatrien-17α-ol-3,20-dione
122. 19-fluoro-16β-methyl-$\Delta^{1,4,6}$-pregnatrien-17α-ol-3,20-dione
123. 19-chloro-$\Delta^{1,4,6}$-pregnatriene-3,20-dione
124. 19-chloro-16α-methyl-$\Delta^{1,4,6}$-pregnatriene-3,20-dione
125. 19-chloro-16β-methyl-$\Delta^{1,4,6}$-pregnatriene-3,20-dione
126. 19-chloro-16α,17α-isopropylidenedioxy-$\Delta^{1,4,6}$-pregnatriene-3,20-dione
127. 19-chloro$\Delta^{1,4,6}$-pregnatrien-17α-ol-3,20-dione
128. 19-chloro-16α-methyl-$\Delta^{1,4,6}$-pregnatrien-17α-ol-3,20-dione
129. 19-chloro-16β-methyl-$\Delta^{1,4,6}$-pregnatrien-17α-ol-3,20-dione

Example XII

When applying the procedure described in Example VII to the $\Delta^{4,6}$-compounds obtained in accordance with Example X, there were obtained the corresponding $\Delta^{1,4,6}$-derivatives.

Example XIII

To a solution of 5 g. of 19-fluoro-$\Delta^4$-pregnen-17α-ol-3,20-dione (Cpd. No. 5) in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-fluoro-$\Delta^4$-pregnen-17α-ol-3,20-dione acetate (Cpd. No. 130).

The Compounds Nos. 6, 7, 12, 13 and 14 were treated following the same procedure, thus affording respectively—

Cpd. No.:
131. 19 - fluoro - 16α - methyl - Δ⁴ - pregnen-17α - ol-3,20-dione acetate
132. 19-fluoro-16β-methyl-Δ⁴-pregnen-17α - ol - 3,20-dione acetate
133. 19 - chloro - Δ⁴ - pregnen - 17α - ol - 3,20 - dione acetate
134. 19-chloro-16α-methyl-Δ⁴-pregnen - 17α - ol-3,20-dione acetate
135. 19-chloro-16β - methyl - Δ⁴ - pregnen - 17α - ol-3,20-dione acetate

*Example XIV*

The Compounds Nos. 47, 48, 49, 54, 55 and 56 were treated in accordance with Example XIII, thus giving respectively—

Cpd. No:
136. 19-fluoro-6α-methyl-Δ⁴-pregnen-17α - ol - 3,20-dione acetate
137. 19-fluoro-6α,16α-dimethyl-Δ⁴-pregnen - 17α - ol-3,20-dione acetate
138. 19-fluoro-6α,16β-dimethyl-Δ⁴-pregnen - 17α - ol-3,20-dione acetate
139. 19-chloro-6α-methyl-Δ⁴-pregnen - 17α - ol - 3,20-dione acetate
140. 19-chloro-6α,16α - dimethyl - Δ⁴ - pregnen - 17α-ol-3,20-dione acetate
141. 19-chloro-6α,16β - dimethyl - Δ⁴ - pregnen - 17α-ol-3,20-dione acetate

*Example XV*

The Compounds Nos. 61, 62, 63, 68, 69 and 70 were treated in accordance with Example XIII, thus giving respectively—

Cpd. No:
142. 6α - chloro - 19 - fluoro - Δ⁴ - pregnen - 17α - ol-3,20-dione acetate
143. 6α-chloro-19-fluoro-16α - methyl - Δ⁴ - pregnen-17α-ol-3,20-dione acetate
144. 6α - chloro - 19 - fluoro - 16β - methyl - Δ⁴-pregnen-17α-ol-3,20-dione acetate
145. 6α,19 - dichloro - Δ⁴ - pregnen - 17α - ol - 3,20-dione acetate
146. 6α,19 - dichloro - 16α - methyl - Δ⁴ - pregnen-17α-ol-3,20-dione acetate
147. 6α,19-dichloro-16β - methyl - Δ⁴ - pregnen - 17α-ol-3,20-dione acetate

*Example XVI*

The Compounds Nos. 75, 76, 77, 82, 83 and 84 were treated in accordance with Example XIII, thus affording respectively—

Cpd. No:
148. 6α,19 - difluoro - Δ⁴ - pregnen - 17α - ol - 3,20-dione acetate
149. 6α,19-difluoro - 16α - methyl - Δ⁴ - pregnen-17α-ol-3,20-dione acetate
150. 6α,19-difluoro - 16β - methyl - Δ⁴ - pregnen-17α-ol-3,20-dione acetate
151. 6α - fluoro - 19 - chloro - Δ⁴ - pregnen - 17α - ol-3,20-dione acetate
152. 6α-fluoro-19-chloro-16α - methyl - Δ⁴ - pregnen-17α-ol-3,20-dione acetate
153. 6α-fluoro - 19 - chloro - 16β - methyl - Δ⁴ - pregnen-17α-ol-3,20-dione acetate

*Example XVII*

The Compounds Nos. 90, 91, 92, 97, 98, 99, 105, 106, 107, 112, 113, 114, 120, 121, 122, 127, 128 and 129, were treated in accordance with Example XIII, thus affording the corresponding acetates.

*Example XVIII*

The starting compounds of Examples XIII, XIV, XV, XVI and XVII were treated in accordance with Example XIII, except that acetic anhydride was substituted by caproic anhydride, thus yielding the corresponding caproates.

*Example XIX*

1 g. of 19-fluoro-16α,17α-isopropylidenedioxy-Δ⁴-pregnene-3,20-dione (Cpd. No. 4) was heated on the steam bath with 20 cc. of 60% formic acid for 1 hour, cooled, diluted with water and the precipitate was collected, washed with water, dried and recrystallized from acetone-hexane, thus affording 19-fluoro-Δ⁴-pregnene-16α,17α-diol-3,20-dione (Cpd. No. 154).

By the same procedure, the compounds Nos. 11, 46, 53, 60, 67, 74, 81, 89, 96, 104, 111, 119, 126 were transformed respectively into—

Cpd. No.:
155. 19-chloro-Δ⁴-pregnene-16α,17α-diol-3,20-dione
156. 19-fluoro-6α-methyl-Δ⁴-pregnene - 16α,17α-diol-3,20-dione
157. 19-chloro-6α-methyl-Δ⁴-pregnene-16α,17α-diol-3,20-dione
158. 6α-chloro-19-fluoro-Δ⁴-pregnene-16α,17α-diol-3,20-dione
159. 6α,19-dichloro-Δ⁴-pregnene-16α,17α-diol-3,20-dione
160. 6α,19-difluoro-Δ⁴-pregnene-16α,17α-diol-3,20-dione
161. 6α-fluoro-19-chloro-Δ⁴-pregnene-16α,17α-diol-3,20-dione
162. 19-fluoro-Δ¹,⁴-pregnadiene-16α,17α-diol-3,20-dione
163. 19-chloro-Δ¹,⁴-pregnadiene-16α,17α-diol-3,20-dione
164. 19-fluoro-Δ⁴,⁶-pregnadiene-16α,17α-diol-3,20-dione
165. 19-chloro-Δ⁴,⁶-pregnadiene-16α,17α-diol-3,20-dione
166. 19-fluoro-Δ¹,⁴,⁶-pregnatriene-16α,17α-diol-3,20-dione
167. 19-chloro-Δ¹,⁴,⁶-pregnatriene-16α,17α-diol-3,20-dione

*Example XX*

A mixture of 1 g. of 19-fluoro-Δ⁴-pregnene-16α,17α-diol-3,20-dione (Cpd. No. 154), 4 cc. of pyridine and 2 cc. of acetic anhydride was kept at room temperature overnight, poured into ice water, the formed precipitate was filtered, washed with water and dried. Crystallization from acetone-hexane gave the 16-acetate of 19-fluoro-Δ⁴-pregnene-16α,17α-diol-3,20-dione (Cpd. No. 168).

The Compounds Nos. 155 to 167, inclusive, were treated by the same procedure thus yielding respectively—

Cpd. No.:
169. 19-chloro-Δ⁴-pregnene-16α,17α-diol-3,20-dione 16-acetate
170. 19-fluoro-6α-methyl-Δ⁴-pregnene-16α,17α-diol-3,20-dione 16-acetate
171. 19-chloro-6α-methyl-Δ⁴-pregnene-16α,17α-diol-3,20-dione 16-acetate
172. 6α-chloro-19-fluoro-Δ⁴-pregnene-16α,17α-diol-3,20-dione 16-acetate
173. 6α,19-dichloro-Δ⁴-pregnene-16α,17α-diol-3,20-dione 16-acetate
174. 6α,19-difluoro-Δ⁴-pregnene-16α,17α-diol-3,20-dione 16-acetate
175. 6α-fluoro-19-chloro-Δ⁴-pregnene-16a,17a-diol-3,20-dione 16-acetate
176. 19-fluoro-Δ¹,⁴-pregnadiene-16α,17α-diol-3,20-dione 16-acetate
177. 19-chloro-Δ¹,⁴-pregnadiene-16α,17α-diol-3,20-dione 16-acetate 178. 19-fluoro-$\Delta^{4,6}$-pregnadiene-16$\alpha$-17$\alpha$-diol-3,20-dione 16-acetate
179. 19-chloro-$\Delta^{4,6}$-pregnadiene-16$\alpha$-17$\alpha$-diol-3,20-dione 16-acetate
180. 19-fluoro-$\Delta^{1,4,6}$-pregnatriene-16$\alpha$,17$\alpha$-diol-3,20-dione 16-acetate
181. 19-chloro-$\Delta^{1,4,6}$-pregnatriene-16$\alpha$,17$\alpha$-diol-3,20-dione 16-acetate

Example XXI

The Compounds Nos. 169 to 181, inclusive, were treated in accordance with Example XIII, thus affording the corresponding 17-acetates.

Example XXII

19 - fluoro-$\Delta^4$-pregnene - 16$\alpha$,17$\alpha$-diol-3,20-dione (Cpd. No. 154) was treated following the procedure described in Example XIII, thus yielding 19-fluoro-$\Delta^4$-pregnene-16$\alpha$,17$\alpha$-diol-3,20-dione diacetate (Cpd. No. 182).

Example XXIII

A suspension of 5 g. of 19-fluoro-$\Delta^4$-pregnene-3,20-dione (Cpd. No. 1) in 37.5 cc. of anhydrous peroxide-free dioxane was treated with 6.0 cc. of freshly distilled ethyl orthoformate and 4.0 g. of p-toluenesulfonic acid. The mixture was stirred at room temperature for 15 minutes and the resulting solution let stand for 30 minutes further. 3.8 cc. of pyridine were added and then water. The formed precipitate was collected by filtration, water washed and air dried. Recrystallization from acetone-hexane afforded 19-fluoro-3-ethoxy-$\Delta^{3,5}$-pregnadien-20-one.

A mixture of 5 g. of the latter 3-ethoxy compound, 2 g. of anhydrous sodium acetate and 100 cc. of acetone was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vacuum and recrystallized from acetone thus giving 6$\beta$-chloro-19-fluoro-$\Delta^4$-pregnene-3,20-dione (Cpd. No. 183).

The Compounds Nos. 2 to 14, inclusive, were treated following the same procedure, thus affording respectively—

Cpd. No.:
184. 6$\beta$-cloro-19-fluoro-16$\alpha$-methyl-$\Delta^4$-pregnene-3,20-dione
185. 6$\beta$ - chloro-19-fluoro-16$\beta$-methyl-$\Delta^4$-pregnene-3,20-dione
186. 6$\beta$ - chloro-19-fluoro-16$\alpha$,17$\alpha$-isopropylidenedioxy-$\Delta^4$-pregnene-3,20-dione
187. 6$\beta$ - chloro-19-fluoro-$\Delta^4$-pregnen-17$\alpha$-ol-3,20-dione
188. 6$\beta$ - chloro - 19 - fluoro-16$\alpha$-methyl-$\Delta^4$-pregnen-17$\alpha$-ol-3,20-dione
189. 6$\beta$-chloro-19-fluoro-16$\beta$-methyl-$\Delta^4$-pregnen-17$\alpha$-ol-3,20-dione
190. 6$\beta$,19-dichloro-$\Delta^4$-pregnene-3,20-dione
191. 6$\beta$,19-dichloro - 16$\alpha$ - methyl-$\Delta^4$-pregnene-3,20-dione
192. 6$\beta$,19-dichloro-16$\beta$-methyl-$\Delta^4$-pregnene-3,20-dione
193. 6$\beta$,19-dichloro-16$\alpha$,17$\alpha$-isopropylidenedioxy-$\Delta^4$-pregnene-3,20-dione
194. 6$\beta$,19-dichloro-$\Delta^4$-pregnen-17$\alpha$-ol-3,20-dione
195. 6$\beta$,19 - dichloro-16$\alpha$-methyl-$\Delta^4$-pregnen-17$\alpha$-ol-3,20-dione
196. 6$\beta$,19-dichloro-16$\beta$-methyl-$\Delta^4$-pregnen-17$\alpha$ - ol-3,20-dione

Example XXIV

A suspension of 1 g. of 19-fluoro-$\Delta^4$-pregnene-3,20-dione (Cpd. No. 1) in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded 19-fluoro-3-ethoxy-$\Delta^{3,5}$-pregnadiene-20-one.

1 g. of the latter steroid was dissolved in 25 cc. of dimethylformamide. The solution was cooled to 0° C. and a stream of perchloryl fluoride was passed for 3 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. By chromatography over washed alumina there was produced 6$\beta$,19-difluoro-$\Delta^4$-pregnene-3,20-dione (Cpd. No. 197).

When applying the above procedures to Compounds, Nos. 2 to 14 inclusive, there were respectively produced—

Cpd. No.:
198. 6$\beta$,19 - difluoro-16$\alpha$-methyl-$\Delta^4$-pregnene-3,20-dione
199. 6$\beta$,19 - difluoro-16$\beta$-methyl-$\Delta^4$-pregnene-3,20-dione
200. 6$\beta$,19 - difluoro-16$\alpha$,17$\alpha$-isopropylidenedioxy-$\Delta^4$-pregnene-3,20-dione
201. 6$\beta$,19-difluoro-$\Delta^4$-pregnen-17$\alpha$-ol-3,20-dione
202. 6$\beta$,19 - difluoro-16$\alpha$-methyl-$\Delta^4$-pregnen-17$\alpha$-ol-3,20-dione
203. 6$\beta$,19 - difluoro-16$\beta$-methyl-$\Delta^4$-pregnen-17$\alpha$-ol-3,20-dione
204. 6$\beta$-fluoro-19-chloro-$\Delta^4$-pregnene-3,20-dione
205. 6$\beta$ - fluoro-19-chloro-16$\alpha$ - methyl-$\Delta^4$-pregnene-3,20-dione
206. 6$\beta$ -fluoro - 19 - chloro-16$\beta$-methyl-$\Delta^4$-pregnene-3,20-dione
207. 6$\beta$ - fluoro-19-chloro-16$\alpha$,17$\alpha$-isopropylidenedioxy-$\Delta^4$-pregnene-3,20-dione
208. 6$\beta$-fluoro - 19 - chloro-$\Delta^4$-pregnen-17$\alpha$-ol-3,20-dione
209. 6$\beta$ - fluoro-19-chloro-16$\alpha$-methyl-$\Delta^4$-pregnen-17$\alpha$-ol-3,20-dione
210. 6$\beta$ - fluoro-19-chloro-16$\beta$-methyl-$\Delta^4$-pregnen-17$\alpha$-ol-3,20-dione

Example XXV

To a solution of 20 cc. of 4 N methylmagnesium bromide in ether was added, with stirring, a solution of 2 g. of 3,20 - bis - cycloethylenedioxy - 5$\alpha$,6$\alpha$ - oxido-19-fluoropregnane (Cpd. No. 29) in 60 cc. of dry tetrahydrofuran and the stirred mixture heated under reflux for 30 minutes. The condenser was then replaced by a calcium chloride tube, the ether allowed to boil off and when the internal temperature reached 54° C., the condenser was readapted and the mixture refluxed for an additional 4 hours. 400 cc. of a saturated solution of ammonium chloride was added slowly to the cooled mixture which was then stirred for 15 minutes before transfer to a separatory funnel. The tetrahydrofuran layer was separated, dried and evaporated to dryness.

A solution of the above residue in 70 cc. of methanol and 7 cc. of 8% aqueous sulfuric acid was refluxed for 40 minutes. It was then neutralized with saturated sodium carbonate solution, concentrated to ca. 20 cc. in vacuo and poured into water. The formed precipitate was filtered off and washed thoroughly with water and air dried.

A solution of the dry precipitate, 7 cc. of dry pyridine was cooled to —10° C., treated with 0.4 cc. of thionyl chloride and the mixture allowed to stand for 4 minutes at this temperature. Ice-water was added and the crystalline precipitate was filtered, washed and dried, yielding 19-fluoro-6β-methyl-Δ⁴-pregnene-3,20-dione (Cpd. No. 211).

The Compounds Nos. 30 to 42, inclusive, were treated by the above method, thus furnishing respectively—

Cpd. No.:
- 212. 19 - fluoro - 6β,16α - dimethyl-Δ⁴-pregnene-3,20-dione
- 213. 19 - fluoro - 6β,16β-dimethyl-Δ⁴-pregnene-3,20-dione
- 214. 19 - fluoro-6β-methyl-16α,17α-isopropylidenedioxy-Δ⁴-pregnene-3,20-dione
- 215. 19 - fluoro - 6β-methyl-Δ⁴-pregnen-17α-ol-3,20-dione
- 216. 19 - fluoro - 6β,16α-dimethyl-Δ⁴-pregnen-17α-ol-3,20-dione
- 217. 19 - fluoro - 6β,16β-dimethyl-Δ⁴-pregnen-17α-ol-3,20-dione
- 218. 19 - chloro - 6β-methyl-Δ⁴-pregnene-3,20-dione
- 219. 19 - chloro - 6β,16α-dimethyl-Δ⁴-pregnene-3,20-dione
- 220. 19 - chloro - 6β,16β-dimethyl-Δ⁴-pregnene-3,20-dione
- 221. 19 - chloro-6β-methyl-16α,17α-isopropylidenedioxy-Δ⁴-pregnene-3,20-dione
- 222. 19 - chloro - 6β-methyl-Δ⁴-pregnen-17α-ol-3,20-dione
- 223. 19 - chloro-6β,16α-dimethyl-Δ⁴-pregnen-17α-ol-3,20-dione
- 224. 19 - chloro - 6β,16β-dimethyl-Δ⁴-pregnen-17α-ol-3,20-dione

*Example XXVI*

The Compounds Nos. 183 to 224, inclusive, were treated following the procedure described in Example VII, thus affording the respective Δ¹,⁴-derivatives.

*Example XXVII*

A solution of 5 g. of Δ⁴-10α-pregnen-19-ol-3,20-dione (Cross U.S. patent application Ser. No. 231,831, filed October 19, 1962), in 25 cc. of pyridine was cooled to 0° C.

Under stirring there was added 1.1 molar equivalents of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 19-tosylate of the starting compound.

A mixture of 4 g. of the crude tosylate, 4 g. of dry lithium fluoride and 50 cc. of dimethyl formamide was refluxed for 1 hour. The mixture was then poured into water, the formed precipitate filtered off and crystallized from acetone-hexane to give Compound No. 225, namely 19-fluoro-Δ⁴-10α-pregnene-3,20-dione.

When applying the above procedure to the starting compounds listed under A (obtained in accordance with the aforesaid patent application), there were obtained the corresponding products under B.

| A | Cpd. No. | B |
|---|---|---|
| 16α-methyl-Δ⁴-10α-pregnen-19-ol-3,20-dione. | 226 | 19-fluoro-16α-methyl-Δ⁴-10α-pregnene-3,20-dione. |
| 16β-methyl-Δ⁴-10α-pregnen-19-ol-3,20-dione. | 227 | 19-fluoro-16β-methyl-Δ⁴-10α-pregnene-3,20-dione. |
| 16α,17α-isopropylidene-dioxy-Δ⁴-10α-pregnen-19-ol-3,20-dione. | 228 | 19-fluoro-16α,17α-isopropylidenedioxy-Δ⁴-10α-pregnene-3,20-dione. |
| Δ⁴-10α-pregnene-17α,19-diol-3,20-dione. | 229 | 19-fluoro-Δ⁴-10α-pregnen-17α-ol-3,20-dione. |
| 16α-methyl-Δ⁴-10α-pregnene-17α,19-diol-3,20-dione. | 320 | 19-fluoro-16α-methyl-Δ⁴-10α-pregnen-17α-ol-3,20-dione. |
| 16β-methyl-Δ⁴-10α-pregnene-17α,19-diol-3,20-dione. | 231 | 19-fluoro-16β-methyl-Δ⁴-10α-pregnen-17α-ol-3,20-dione. |

The starting compounds indicated hereinbefore were treated following the above procedures, except that lithium fluoride was substituted by lithium chloride, thus yielding respectively—

Cpd. No.:
- 232. 19-chloro-Δ⁴-10α-pregnen-3,20-dione
- 233. 19 - chloro - 16α - methyl-Δ⁴-10α-pregnene-3,20-dione
- 234. 19 - chloro - 16β - methyl-Δ⁴-10α-pregnene-3,20-dione
- 235. 19 - chloro - 16α,17α - isopropylidenedioxy - Δ⁴-10α-pregnene-3,20-dione
- 236. 19-chloro-Δ⁴-10α-pregnen-17α-ol-3,20-dione
- 237. 19 - chloro-16α - methyl-Δ⁴-10α-pregnen-17α-ol-3,20-dione
- 238. 19 - chloro - 16β-methyl-Δ⁴-10α-pregnen-17α-ol-3,20-dione

*Example XXVIII*

A mixture of 5 g. of 19-fluoro-Δ⁴-10α-pregnene-3,20-dione (Cpd. No. 225) 150 cc. of anhydrous benzene, 60 cc. of ethyleneglycol distilled over sodium hydroxide and 800 mg. of p-toluene sulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3,20-biscycloethylenedioxy-19-fluoro-Δ⁵-10α-pregnene (Cpd. No. 239).

The Compounds, Nos. 226 to 238, inclusive, obtained according to Example XXVII, were treated following the same procedure, thus affording respectively—

Cpd. No.:
- 240. 3,20-bis-cycloethylenedioxy-19-fluoro-16α-methyl-Δ⁵-10α-pregnene,
- 241. 3,20-bis-cycloethylenedioxy-19-fluoro-16β-methyl-Δ⁵-10α-pregnene
- 242. 3,20-bis-cycloethylenedioxy-19-fluoro-16α,17α-isopropylidenedioxy-Δ⁵-10α-pregnene
- 243. 3,20-bis-cycloethylenedioxy-19-fluoro-Δ⁵-10α-pregnen-17α-ol
- 244. 3,20-bis-cycloethylenedioxy-19-fluoro-16α-methyl-Δ⁵-10α-pregnen-17α-ol
- 245. 3,20-bis-cycloethylenedioxy-19-fluoro-16β-methyl-Δ⁵-10α-pregnen-17α-ol
- 246. 3,20-bis-cycloethylenedioxy-19-chloro-Δ⁵-10α-pregnene
- 247. 3,20-bis-cycloethylenedioxy-19-chloro-16α-methyl-Δ⁵-10α-pregnene
- 248. 3,20-bis-cycloethylenedioxy-19-chloro-16β-methyl-Δ⁵-10α-pregnene
- 249. 3,20-bis-cycloethylenedioxy-19-chloro-16α,17α-isopropylidenedioxy-Δ⁵-10α-pregnene
- 250. 3,20-bis-cycloethylenedioxy-19-chloro-Δ⁵-10α-pregnen-17α-ol
- 251. 3,20-bis-cycloethylenedioxy-19-chloro-16α-methyl-Δ⁵-10α-pregnen-17α-ol
- 252. 3,20-bis-cycloethylenedioxy-19-chloro-16β-methyl-Δ⁵-10α-pregnen-17α-ol

*Example XXIX*

A solution of 2.5 g. of 3,20-bis-cycloethylenedioxy-19-fluoro-Δ⁵-10α-pregnene (Cpd. No. 239), in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 3,20-bis-cycloethylenedioxy-5α,6α-oxido-19-fluoro-10α-pregnane (Cpd. No. 253).

When applying the above procedure to the Compounds, Nos. 240 to 252, inclusive, there were obtained respectively—

Cpd. No.:
254. 3,20-bis-cycloethylenedioxy-5α,6α-oxido-19-fluoro-16α-methyl-10α-pregnane
255. 3,20-bis-cycloethylenedioxy-5α,6α-oxido-19-fluoro-16β-methyl-10α-pregnane
256. 3,20-bis-cycloethylenedioxy-5α,6α-oxido-19-fluoro-16α,17α-isopropylidenedioxy-10α-pregnane
257. 3,20-bis-cycloethylenedioxy-5α,6α-oxido-19-fluoro-10α-pregnan-17α-ol
258. 3,20-bis-cycloethylenedioxy-5α,6α-oxido-19-fluoro-16α-methyl-10α-pregnan-17α-ol
259. 3,20-bis-cycloethylenedioxy-5α,6α-oxido-19-fluoro-16β-methyl-10α-pregnan-17α-ol
260. 3,20-bis-cycloethylenedioxy-5α,6α-oxido-19-chloro-10α-pregnane
261. 3,20-bis-cycloethylenedioxy-5α,6α-oxido-19-chloro-16α-methyl-10α-pregnane
262. 3,20-bis-cycloethylenedioxy-5α,6α-oxido-19-chloro-16β-methyl-10α-pregnane
263. 3,20-bis-cycloethylenedioxy-5α,6α-oxido-19-chloro-16α,17α-isopropylidenedioxy-10α-pregnane
264. 3,20-bis-cycloethylenedioxy-5α,6α-oxido-19-chloro-10α-pregnan-17α-ol
265. 3,20-bis-cycloethylenedioxy-5α,6α-oxido-19-chloro-16α-methyl-10α-pregnan-17α-ol
266. 3,20-bis-cycloethylenedioxy-5α,6α-oxido-19-chloro-16β-methyl-10α-pregnan-17α-ol

*Example XXX*

To a solution of 40 cc. of 4 N methylmagnesium bromide in ether was added, with stirring, a solution of 2 g. of 3,20 - bis - cycloethylenedioxy-5α,6α-oxido-19-fluoro-10α-pregnane (Cpd. No. 253) in 60 cc. of dry tetrahydrofuran and the stirred mixture heated under reflux for 30 minutes. The condenser was then replaced by a calcium chloride tube, the ether allowed to boil off and when the internal temperature reached 54° C., the condenser was readapted and the mixture refluxed for an additional 4 hours. 400 cc. of a saturated solution of ammonium chloride was added slowly to the cooled mixture which was then stirred for 15 minutes before transfer to a separatory funnel. The tetrahydrofuran layer was separated, dried and evaporated to dryness, thus affording a solid residue.

A solution of the above residue in 70 cc. of methanol and 7 cc. of 8% aqueous sulfuric acid was refluxed for 40 minutes. It was then neutralized with saturated sodium carbonate solution, concentrated to ca. 20 cc. in vacuo and poured into water. The formed precipitate was filtered off and washed thoroughly with water and air dried.

A solution of the dry precipitate in 100 cc. of methanol and 50 cc. of 1 N aqueous sodium hydroxide was allowed to stand at room temperature under a nitrogen atmosphere for 24 hours. The solution was then concentrated under reduced pressure and without heating to half its volume, ice water was added and the crystalline precipitate filtered, washed and dried. Recrystallization from aqueous acetone gave 19-fluoro-6α-methyl-Δ⁴-10α-pregnene-3,20-dione (Cpd. No. 267).

The Compounds, Nos. 254 to 266 inclusive, were treated by the above method, furnishing respectively—

Cpd. No.:
268. 19 - fluoro - 6α,16α-dimethyl-Δ⁴-10α-pregnene-3,20-dione
269. 19-fluoro-6α-16β-dimethyl-Δ⁴-10α-pregnene-3-20-dione
270. 19-fluoro-6α-methyl-16α,17α-isopropylidenedioxy-Δ⁴-10α-pregnene-3,20-dione
271. 19-fluoro-6α-methyl-Δ⁴-10α-pregnen-17α-ol-3,20-dione
272. 19-fluoro-6α,16α-dimethyl-Δ⁴-10α-pregnen-17α-ol-3,20-dione
273. 19-fluoro-6α,16β-dimethyl-Δ⁴-10α-pregnen-17α-ol-3,20-dione
274. 19-chloro-6α-methyl-Δ⁴-10α-pregnene-3,20-dione
275. 19-chloro-6α,16α-dimethyl-Δ⁴-10α-pregnene-3,20-dione
276. 19-chloro-6α,16β-dimethyl-Δ⁴-10α-pregnene-3,20-dione
277. 19-chloro-6α-methyl-16α,17α-isopropylidenedioxy-Δ⁴-10α-pregnene-3,20-dione
278. 19-chloro-6α-methyl-Δ⁴-10α-pregnen-17α-ol-3,20-dione
279. 19-chloro-6α,16α-dimethyl-Δ⁴-10α-pregnen-17α-ol-3,20-dione
280. 19-chloro-6α,16β-dimethyl-Δ⁴-10α-pregnen-17α-ol-3,20-dione

*Example XXXI*

Into a suspension of 1 g. of 3,20-bis-cycloethylenedioxy-5α,6α-oxido-19-fluoro-10α-pregnane (Cpd. No. 253) in 35 cc. of anhydrous ethyl acetate at 10° C. was passed a slow stream of dry hydrochloric acid, after 10 minutes all the solid material was dissolved. The gas was passed through the reaction mixture for a total of 5 hours. The solution was then washed abundantly with water, the organic layer was separated, dried over sodium sulfate and evaporated to dryness. The residue was washed with water to neutrality and dried. Recrystallization from methylene chloride afforded 6α-chloro-19-fluoro-Δ⁴-10α-pregnene-3,20-dione (Cpd. No. 281).

By the same procedure, the Compounds Nos. 30 to 42 inclusive, were respectively converted into—

Cpd. No.:
282. 6α-chloro-19-fluoro-16α-methyl-Δ⁴-10α-pregnene-3,20-dione
283. 6α-chloro-19-fluoro-16β-methyl-Δ⁴-10α-pregnene-3,20-dione
284. 6α-chloro-19-fluoro-16α,17α-isopropylidenedioxy-Δ⁴-10α-pregnene-3,20-dione
285. 6α-chloro-19-fluoro-Δ⁴-10α-pregnen-17α-ol-3,20-dione
286. 6α-chloro-19-fluoro-16α-methyl-Δ⁴-10α-pregnen-17α-ol-3,20-dione
287. 6α-chloro-19-fluoro-16β-methyl-Δ⁴-10α-pregnen-17α-ol-3,20-dione
288. 6α,19-dichloro-Δ⁴-10α-pregnene-3,20-dione
289. 6α,19-dichloro-16α-methyl-Δ⁴-10α-pregnene-3,20-dione
290. 6α,19-dichloro-16β-methyl-Δ⁴-10α-pregnene-3,20-dione
291. 6α,19-dichloro-16α,17α-isopropylidenedioxy-Δ⁴-10α-pregnene-3,20-dione
292. 6α,19-dichloro-Δ⁴-10α-pregnen-17α-ol-3,20-dione
293. 6α,19-dichloro-16α-methyl-Δ⁴-10α-pregnen-17α-ol-3,20-dione
294. 6α,19-dichloro-16β-methyl-Δ⁴-10α-pregnen-17α-ol-3,20-dione

*Example XXXII*

2.8 cc. of boron trifluoride etherate was slowly added with stirring to 220 mg. of anhydrous hydrogen fluoride cooled in an acetone-Dry Ice bath.

To a solution of 1 g. of 3,20-bis-cycloethylenedioxy-5α,6α-oxido-19-fluoro-10α-pregnane (Cpd. No. 253) in 10 cc. of a mixture of equal parts of benzene and ether was added 1.3 cc. of the fluoroboric acid reagent. The mixture was kept for 3 hours at room temperature, then washed four times with water, dried over anhydrous sodium sulfate and the solvent evaporated under reduced pressure. The residue was mixed with 35 cc. of anhydrous ethyl acetate and there was passed a slow stream of dry hydrochloric acid. The gas was passed through the reaction mixture for a total of 5 hours. The solution was then washed abundantly with water, the organic layer was separated, dried over sodium sulfate and evaporated to dryness. The residue was washed with water to neutrality and dried. Recrystallization from methylene chloride afforded 6α,19-difluoro-Δ⁴-10α-pregnene-3,20-dione (Cpd. No. 295).

When applying the same procedure to the Compounds Nos. 30 to 42 inclusive, there were respectively obtained—

Cpd. No.:
- 296. 6α,19-difluoro-16α-methyl-Δ⁴-10α-pregnene-3,20-dione
- 297. 6α,19-difluoro-16β-methyl-Δ⁴-10α-pregnene-3,20-dione
- 298. 6α,19-difluoro-16α,17α-isopropylidenedioxy Δ⁴-10α-pregnene-3,20-dione
- 299. 6α,19-difluoro-Δ⁴-10α-pregnen-17α-ol-3,20-dione
- 300. 6α,19-difluoro-16α-methyl-Δ⁴-10α-pregnen-17α-ol-3,20-dione
- 301. 6α,19-difluoro-16β-methyl-Δ⁴-10α-pregnen-17α-ol-3,20-dione
- 302. 6α-fluoro-19-chloro-Δ⁴-10α-pregnene-3,20-dione
- 303. 6α-fluoro-19-chloro-16α-methyl-Δ⁴-10α-pregnene-3,20-dione
- 304. 6α-fluoro-19-chloro-16β-methyl-Δ⁴-10α-pregnene-3,20-dione
- 305. 6α-fluoro-19-chloro-16α,17α-isopropylidenedioxy-Δ⁴-10α-pregnene-3,20-dione
- 306. 6α-fluoro-19-chloro-Δ⁴-10α-pregnen-17α-ol-3,20-dione
- 307. 6α-fluoro-19-chloro-16α-methyl-Δ⁴-10α-pregnen-17α-ol-3,20-dione
- 308. 6α-fluoro-19-chloro-16β-methyl-Δ⁴-10α-pregnen-17α-ol-3,20-dione

*Example XXXIII*

A mixture of 500 mg. of 19-fluoro-6α-methyl-Δ⁴-10α-pregnene-3,20-dione (Cpd. No. 267), 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 19-fluoro-6α-methyl-Δ¹,⁴-10α-pregnadiene-3,20-dione (Cpd. No. 309).

The Compounds Nos 225 to 238 inclusive, were treated following the same procedure, thus affording correspondingly—

Cpd. No.:
- 310. 19-fluoro-Δ¹,⁴-10α-pregnadiene-3,20-dione
- 311. 19-fluoro-16α-methyl-Δ¹,⁴-10α-pregnadiene-3,20-dione
- 312. 19-fluoro-16β-methyl-Δ¹,⁴-10α-pregnadiene-3,20-dione
- 313. 19-fluoro-16α,17α-isopropylidenedioxy-Δ¹,⁴-10α-pregnadiene-3,20-dione
- 314. 19-fluoro-Δ¹,⁴-10α-pregnadien-17α-ol-3,20-dione
- 315. 19-fluoro-16α-methyl-Δ¹,⁴-10α-pregnadien-17α-ol-3,20-dione
- 316. 19-fluoro-16β-methyl-Δ¹,⁴-10α-pregnadien-17α-ol-3,20-dione
- 317. 19-chloro-Δ¹,⁴-10α-pregnadiene-3,20-dione
- 318. 19-chloro-16α-methyl-Δ¹,⁴-10α-pregnadiene-3,20-dione
- 319. 19-chloro-16β-methyl-Δ¹,⁴-10α-pregnadiene-3,20-dione
- 320. 19-chloro-16α,17α-isopropylidenedioxy-Δ¹,⁴-10α-pregnadiene-3,20-dione
- 321. 19-chloro-Δ¹,⁴-10α-pregnadien-17α-ol-3,20-dione
- 322. 19-chloro-16α-methyl-Δ¹,⁴-10α-pregnadien-17α-ol-3,20-dione
- 323. 19-chloro-16β-methyl-Δ¹,⁴-10α-pregnadien-17α-ol-3,20-dione

*Example XXXIV*

When applying the procedure described in the foregoing example to Compounds Nos. 268 to 308, inclusive, there were obtained the corresponding Δ¹,⁴-derivatives.

*Example XXXV*

A suspension of 1 g. of 19-fluoro-6α-methyl-Δ⁴-10α-pregnene-3,20-dione (Cpd. No. 267), in 7.5 cc. of anhydrous peroxide free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded 19-fluoro-6-methyl-3-ethoxy-Δ³,⁵-10α-pregnadien-20-one.

A solution of 1 g. of the latter compound in 20 cc. of tetrahydrofuran was cooled to 0° C. and there were added 1.05 molar equivalents of 2,3-dichloro-5,6-dicyano-1,4-benzoquinone and 100 mg. of p-toluenesulfonic acid. The resulting mixture was further stirred at 0° C. for 30 minutes. The precipitated hydroquinone was filtered off and 100 cc. of methylene dichloride were added to the filtrate. The organic solution was washed with 5% aqueous sodium hydroxide solution until the washings were colorless, then with water to neutrality, dried over anhydrous sodium sulfate and evaporated to dryness. Crystallization from acetone-hexane gave 19-fluoro-6-methyl-Δ⁴,⁶-10α-pregnadiene-3,20-dione (Cpd. No. 324).

The Compounds Nos. 225 to 238, inclusive, were treated following the same procedure, thus affording correspondingly—

Cpd. No.:
- 325. 19-fluoro-Δ⁴,⁶-10α-pregnadiene-3,20-dione
- 326. 19-fluoro-16α-methyl-Δ⁴,⁶-10α-pregnadiene-3,20-dione
- 327. 19-fluoro-16β-methyl-Δ⁴,⁶-10α-pregnadiene-3,20-dione
- 328. 19-fluoro-16α,17α-isopropylidenedioxy-Δ⁴,⁶-10α-pregnadiene-3,20-dione
- 329. 19-fluoro-Δ⁴,⁶-10α-pregnadien-17α-ol-3,20-dione
- 330. 19-fluoro-16α-methyl-Δ⁴,⁶-10α-pregnadien-17α-ol-3,20-dione
- 331. 19-fluoro-16β-methyl-Δ⁴,⁶-10α-pregnadien-17α-ol-3,20-dione
- 332. 19-chloro-Δ⁴,⁶-10α-pregnadiene-3,20-dione
- 333. 19-chloro-16α-methyl-Δ⁴,⁶-10α-pregnadiene-3,20-dione
- 334. 19-chloro-16β-methyl-Δ⁴,⁶-10α-pregnadiene-3,20-dione
- 335. 19-chloro-16α,17α-isopropylidenedioxy-Δ⁴,⁶-10α-pregnadiene-3,20-dione
- 336. 19-chloro-Δ⁴,⁶-10α-pregnadien-17α-ol-3,20-dione
- 337. 19-chloro-16α-methyl-Δ⁴,⁶-10α-pregadien-17α-ol-3,20-dione
- 338. 19-chloro-16β-methyl-Δ⁴,⁶-10α-pregnadien-17α-ol-3,20-dione

*Example XXXVI*

When applying the procedure described in the foregoing example to Compounds Nos. 268 to 308, inclusive, there were obtained the corresponding Δ⁴,⁶-derivatives.

*Example XXXVII*

19-fluoro-6-methyl-Δ⁴,⁶-10α-pregnadiene-3,20-dione (Cpd. No. 324) was treated in accordance with Example VII, thus affording 19-fluoro-6-methyl-Δ¹,⁴,⁶-10α-pregnatriene-3,20-dione (Cpd. No. 339).

Upon treatment by the same procedure of Compounds

Nos. 325 to 338, inclusive, there were respectively produced—

Cpd. No.:
340. 19-fluoro-$\Delta^{1,4,6}$-10α-pregnatriene-3,20-dione
341. 19 - fluoro - 16α - methyl -$\Delta^{1,4,6}$ - 10α-pregnatriene-3,20-dione
342. 19 - fluoro - 16α - methyl - $\Delta^{1,4,6}$ - 10α-pregnatriene-3,20-dione
343. 19 - fluoro - 16α,17α - isopropylidenedioxy-$\Delta^{1,4,6}$-10α-pregnatriene-3,20-dione
344. 19 - fluoro-$\Delta^{1,4,6}$ - 10α-pregnatriene-17α-ol-3,20-dione
345. 19 - fluoro - 16α - methyl - $\Delta^{1,4,6}$ - 10α - pregnatrien-17α-ol-3,20-dione
346. 19 - fluoro - 16β - methyl - $\Delta^{1,4,6}$ - 10α - pregnatrien-17α-ol-3,20-dione
347. 19-chloro-$\Delta^{1,4,6}$-10α-pregnatriene-3,20-dione
348. 19 - chloro-16α-methyl-$\Delta^{1,4,6}$-10α-pregnatriene-3,20-dione
349. 19 - chloro-16β-methyl-$\Delta^{1,4,6}$-10α-pregnatriene-3,20-dione
350. 19 - chloro-16α,17α-isopropylidenedioxy-$\Delta^{1,4,6}$-10α-pregnatriene-3,20-dione
351. 19 - chloro - $\Delta^{1,4,6}$-10α-pregnatrien-17α-ol-3,20-dione
352. 19 - chloro - 16α-methyl-$\Delta^{1,4,6}$-10α-pregnatrien-17α-ol-3,20-dione
353. 19 - chloro - 16β-methyl-$\Delta^{1,4,6}$-10α-pregnatrien-17α-ol-3,20-dione

*Example XXXVIII*

When applying the procedure described in Example XXXIII to the $\Delta^{4,6}$-compounds obtained in accordance with Example XXXVI, there were obtained the corresponding $\Delta^{1,4,6}$-derivatives.

*Example XXXIX*

To a solution of 5 g. of 19-fluoro-$\Delta^4$-10α-pregnen-17α-ol-3,20-dione (Cpd. No. 229) in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-fluoro-$\Delta^4$-10α-pregnen-17α-ol-3,20-dione acetate (Cpd. No. 354).

The Compounds Nos. 230, 231, 236, 237 and 238 were treated following the same procedure, thus affording respectively—

Cpd. No.:
355. 19-fluoro-16α-methyl-$\Delta^4$-10α-pregnen-17α-ol-3,20-dione acetate
356. 19-fluoro-16β-methyl-$\Delta^4$-10α-pregnen-17α-ol-3,20-dione acetate
357. 19-chloro-$\Delta^4$-10α-pregnen-17α-ol-3,20-dione acetate
358. 19-chloro-16α-methyl-$\Delta^4$-10α-pregnen-17α-ol-3,20-dione acetate
359. 19-chloro-16β-methyl-$\Delta^4$-10α-pregnen-17α-ol-3,20-dione acetate

*Example XL*

The compounds Nos. 271, 272, 273, 278, 279, and 280 were treated in accordance with Example XXXIX, thus giving respectively—

Cpd. No.:
360. 19-fluoro-6α-methyl-$\Delta^4$-10α-pregnen-17α-ol-3,20-dione acetate
361. 19-fluoro-6α,16α-dimethyl-$\Delta^4$-10α-pregnen-17α-ol-3,20-dione acetate
362. 19-fluoro-6α,16β-dimethyl-$\Delta^4$-10α-pregnen-17α-ol-3,20-dione acetate
363. 19-chloro-6α-methyl-$\Delta^4$-10α-pregnen-17α-ol-3,20-dione acetate
364. 19-chloro-6α,16α-dimethyl-$\Delta^4$-10α-pregnen-17α-ol-3,20-dione acetate
365. 19-chloro-6α,16β-dimethyl-$\Delta^4$-10α-pregnen-17α-ol-3,20-dione acetate

*Example XLI*

The compounds Nos. 285, 286, 287, 292, 293, and 294 were treated in accordance with Example XXXIX, thus giving respectively—

Cpd. No.:
366. 6α-chloro-19-fluoro-$\Delta^4$-10α-pregnen-17α-ol-3,20-dione acetate
367. 6α-chloro-19-fluoro-16α-methyl-$\Delta^4$-10α-pregnen-17α-ol-3,20-dione acetate
368. 6α-chloro-19-fluoro-16β-methyl-$\Delta^4$-10α-pregnen-17α-ol-3,20-dione acetate
369. 6α,19-dichloro-$\Delta^4$-10α-pregnen-17α-ol-3,20-dione acetate
370. 6α,19-dichloro-16α-methyl-$\Delta^4$-10α-pregnen-17α-ol-3,20-dione acetate
371. 6α,19-dichloro-16α-methyl-$\Delta^4$-10α-pregnen-17α-ol-3,20-dione acetate

*Example XLII*

The Compounds Nos. 299, 300, 301, 306, 307, and 308 were treated in accordance with Example XXXIX, thus affording respectively—

Cpd. No.:
372. 6α,19-difluoro-$\Delta^4$-10α-pregnen-17α-ol-3,20-dione acetate
373. 6α,19-difluoro-16α-methyl-$\Delta^4$-10α-pregnen-17α-ol-3,20-dione acetate
374. 6α-19-difluoro-16β-methyl-$\Delta^4$-10α-pregnen-17α-ol-3,20-dione acetate
375. 6α-fluoro-19-chloro-$\Delta^4$-10α-pregnen-17α-ol-3,20-dione acetate
376. 6α-fluoro-19-chloro-16α-methyl-$\Delta^4$-10α-pregnen-17α-ol-3,20-dione acetate
377. 6α-fluoro-19-chloro-16β-methyl-$\Delta^4$-10α-pregnen-17α-ol-3,20-dione acetate

*Example XLIII*

The Compounds Nos. 314, 315, 316, 321, 322, 323, 329, 330, 331, 336, 337, 338, 344, 345, 346, 351, 352, and 353 were treated in accordance with Example XXXIX, thus affording the corresponding acetates.

*Example XLIV*

The starting compounds of Examples XXXIX, XL, XLI, XLII and XLIII were treated in accordance with Example XXXIX, except that acetic anhydride was substituted by caproic anhydride, thus yielding the corresponding caproates.

*Example XLV*

1 g. of 19-fluoro-16α,17α-isopropylidenedioxy-$\Delta^4$-10α-pregnene-3,20-dione (Cpd. No. 228) was heated on the steam bath with 20 cc. of 60% formic acid for 1 hour, cooled, diluted with water and the precipitate was collected, washed with water, dried and recrystallized from acetone-hexane, thus affording 19-fluoro-$\Delta^4$-10α-pregnene-16α,17α-diol-3,20-dione (Cpd. No. 378).

By the same procedure, the Compounds Nos. 235, 270, 277, 284, 291, 298, 305, 313, 320, 328, 335, 343 and 350 were transformed respectively into—

Cpd. No.:
379. 19-chloro-$\Delta^4$-10α-pregnene-16α,17α-diol-3,20-dione
380. 19-fluoro-6α-methyl-$\Delta^4$-10α-pregnene-16α,17α-diol-3,20-dione 381. 19-chloro-6α-methyl-Δ⁴-10α-pregnene-16α,17α-diol-3,20-dione
382. 6α-chloro-19-fluoro-Δ⁴-10α-pregnene-16α,17α-diol-3,20-dione
383. 6α,19-dichloro-Δ⁴-10α-pregnene-16α,17α-diol-3,20-dione
384. 6α,19-difluoro-Δ⁴-10α-pregnene-16α,17α-diol-3,20-dione
385. 6α-fluoro-19-chloro-Δ⁴-10α-pregnene-16α,17α-diol-3,20-dione
386. 19-fluoro-Δ¹,⁴-10α-pregnadiene-16α,17α-diol-3,20-dione
387. 19-chloro-Δ¹,⁴-10α-pregnadiene-16α,17α-diol-3,20-dione
388. 19-fluoro-Δ⁴,⁶-10α-pregnadiene-16α,17α-diol-3,20-dione
389. 19-chloro-Δ⁴,⁶-10α-pregnadiene-16α,17α-diol-3,20-dione
390. 19-fluoro-Δ¹,⁴,⁶-10α-pregnatriene-16α,17α-diol-3,20-dione
391. 19-chloro-Δ¹,⁴,⁶-10α-pregnatriene-16α,17α-diol-3,20-dione

Example XLVI

A mixture of 1 g. of 19-fluoro-Δ⁴-10α-pregnene-16α,17α-diol-3,20-dione (Cpd. No. 378), 4 cc. of pyridine and 2 cc. of acetic anhydride was kept at room temperature overnight, poured into ice water, the formed precipitate was filtered, washed with water and dried. Crystallization from acetone-hexane gave the 16-acetate of 19-fluoro-Δ⁴-10α-pregnene-16α,17α-diol-3,20-dione (Cpd. No. 392).

The Compounds Nos. 379 to 391, inclusive, were treated by the same procedure thus yielding respectively—

Cpd. No.:
393. 19-chloro-Δ⁴-10α-pregnene-16α,17α-diol-3,20-dione 16-acetate
394. 19-fluoro-6α-methyl-Δ⁴-10α-pregnene-16α,17α-diol-3,20-dione 16-acetate
395. 19-chloro-6α-methyl-Δ⁴-10α-pregnene-16α,17α-diol-3,20-dione 16-acetate
396. 6α-chloro-19-fluoro-Δ⁴-10α-pregnene-16α,17α-diol-3,20-dione 16-acetate
397. 6α,19-dichloro-Δ⁴-10α-pregnene-16α,17α-diol-3,20-dione 16-acetate
398. 6α,19-difluoro-Δ⁴-10α-pregnene-16α,17α-diol-3,20-dione 16-acetate
399. 6α-fluoro-19-chloro-Δ⁴-10α-pregnene-16α,17α-diol-3,20-dione 16-acetate
400. 19-fluoro-Δ¹,⁴-10α-pregnadiene-16α,17α-diol-3,20-dione 16-acetate
401. 19-chloro-Δ¹,⁴-10α-pregnadiene-16α,17α-diol-3,20-dione 16-acetate
402. 19-fluoro-Δ⁴,⁶-10α-pregnadiene-16α,17α-diol-3,20-dione 16-acetate
403. 19-chloro-Δ⁴,⁶-10α-pregnadiene-16α-17α-diol-3,20-dione 16-acetate
404. 19-fluoro-Δ¹,⁴,⁶-10α-pregnatriene-16α,17α-diol-3,20-dione 16-acetate
405. 19-chloro-Δ¹,⁴,⁶-10α-pregnatriene-16α,17α-diol-3,20-dione 16-acetate

Example XLVII

The compounds Nos. 393 to 405, inclusive, were treated in accordance with Example XXXIX, thus affording the corresponding 17-acetates.

Example XLVIII 19-fluoro-Δ⁴-10α-pregnene-16α,17α-diol-3,20-dione (Cpd. No. 378) was treated following the procedure described in Example XXXIX, thus yielding 19-fluoro-Δ⁴-10α-pregnene-16α,17α-diol-3,20-dione diacetate (Cpd. No. 406).

Example XLIX

A suspension of 5 g. of 19-fluoro-Δ⁴-10α-pregnene-3,20-dione (Cpd. No. 225), in 37.5 cc. of anhydrous peroxide-free dioxane was treated with 6.0 cc. of freshly distilled ethyl orthoformate and 4.0 g. of p-toluenesulfonic acid. The mixture was stirred at room temperature for 15 minutes and the resulting solution let stand for 30 minutes further. 3.8 cc. of pyridine were added and then water. The formed precipitate was collected by filtration, water washed and air dried. Recrystallization from acetone-hexane afforded 19-fluoro-3-ethoxy-Δ³,⁵-10α-pregnadien-20-one.

A mixture of 5 g. of the latter 3-ethoxy compound 2 g. of anhydrous sodium acetate and 100 cc. of acetone was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vacuum and recrystallized from acetone thus giving 6β-chloro-19-fluoro-Δ⁴-10α-pregnene-3,20-dione (Cpd. No. 407).

The Compounds Nos. 226 to 238, inclusive, were treated following the same procedures, thus affording respectively—

Cpd. No:
408. 6β-chloro-19-fluoro-16α-methyl-Δ⁴-10α-pregnene-3,20-dione
409. 6β-chloro-19-fluoro-16β-methyl-Δ⁴-10α-pregnene-3,20-dione
410. 6β-chloro-19-fluoro-16α,17α-isopropylidenedioxy-Δ⁴-10α-pregnene-3,20-dione
411. 6β-chloro-19-fluoro-Δ⁴-10α-pregnen-17α-ol-3,20-dione
412. 6β-chloro-19-fluoro-16α-methyl-Δ⁴-10α-pregnen-17α-ol-3,20-dione
413. 6β-chloro-19-fluoro-16β-methyl-Δ⁴-10α-pregnen-17α-ol-3,20-dione
414. 6α,19-dichloro-Δ⁴-10α-pregnene-3,20-dione
415. 6β,19-dichloro-16α-methyl-Δ⁴-10α-pregnene-3,20-dione
416. 6β,19-dichloro-16β-methyl-Δ⁴-10α-pregnene-3,20-dione
417. 6β,19-dichloro-16α,17α-isopropylidenedioxy-Δ⁴-10α-pregnene-3,20-dione
418. 6β,19-dichloro-Δ⁴-10α-pregnen-17α-ol-3,20-dione
419. 6β,19-dichloro-16α-methyl-Δ⁴-10α-pregnen-17α-ol-3,20-dione
420. 6β,19-dichloro-16β-methyl-Δ⁴-10α-pregnen-17α-ol-3,20-dione

Example L

A suspension of 1 g. of 19-fluoro-Δ⁴-10α-pregnene-3,20-dione (Cpd. No. 225) in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded 19-fluoro-3-ethoxy-Δ³,⁵-10α-pregnadiene-20-one.

1 g. of the latter steroid was dissolved in 25 cc. of dimethylformamide. The solution was cooled to 0° C. and a stream of perchloryl fluoride was passed for 3 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. By chromatography over washed alumina there was produced 6β,19-difluoro-Δ⁴-10α-pregnene-3,20-dione (Cpd. No. 421).

When applying the above procedures to Compounds Nos. 226 to 238, inclusive, there were respectively produced—

Cpd. No:
- 422. 6β,19-difluoro-16α-methyl-Δ⁴-10α-pregnene-3,20-dione
- 423. 6β,19-difluoro-16β-methyl-Δ⁴-10α-pregnene-3,20-dione
- 424. 6β,19-difluoro-16α,17α-isopropylidenedioxy-Δ⁴-10α-pregnene-3,20-dione
- 425. 6β,19-difluoro-Δ⁴-10α-pregnen-17α-ol-3,20-dione
- 426. 6β,19-difluoro-16α-methyl-Δ⁴-10α-pregnen-17α-ol-3,20-dione
- 427. 6β,19-difluoro-16β-methyl-Δ⁴-10α-pregnen-17α-ol-3,20-dione
- 428. 6β-fluoro-19-chloro-Δ⁴-10α-pregnene-3,20-dione
- 429. 6β-fluoro-19-chloro-16α-methyl-Δ⁴-10α-pregnene-3,20-dione
- 430. 6β-fluoro-19-chloro-16β-methyl-Δ⁴-10α-pregnene-3,20-dione
- 431. 6β-fluoro-19-chloro-16α,17α-isopropylidenedioxy-Δ⁴-10α-pregnene-3,20-dione
- 432. 6β-fluoro-19-chloro-Δ⁴-10α-pregnen-17α-ol-3,20-dione
- 433. 6β-fluoro-19-chloro-16α-methyl-Δ⁴-10α-pregnen-17α-ol-3,20-dione
- 434. 6β-fluoro-19-chloro-16β-methyl-Δ⁴-10α-pregnen-17α-ol-3,20-dione

*Example LI*

To a solution of 20 cc. of 4 N methylmagnesium bromide in ether was added, with stirring, a solution of 2 g. of 3,20-bis-cycloethylenedioxy-5α,6α-oxido-19-fluoro-10α-pregnane (Cpd. No. 253) in 60 cc. of dry tetrahydrofuran and the stirred mixture heated under reflux for 30 minutes. The condenser was then replaced by a calcium chloride tube, the ether allowed to boil off and when the internal temperature reached 54° C., the condenser was re-adapted and the mixture refluxed for an additional 4 hours. 400 cc. of a saturated solution of ammonium chloride was added slowly to the cooled mixture which was then stirred for 15 minutes before transfer to a separatory funnel. The tetrahydrofuran layer was separated, dried, and evaporated to dryness.

A solution of the above residue in 70 cc. of methanol and 7 cc. of 8% aqueous sulfuric acid was refluxed for 40 minutes. It was then neutralized with saturated sodium carbonate solution, concentrated to ca. 20 cc. in vacuo and poured into water. The formed precipitate was filtered off and washed thoroughly with water and air dried.

A solution of the dry precipitate, 7 cc. of dry pyridine was cooled to −10° C., treated with 0.4 cc. of thionyl chloride and the mixture allowed to stand for 4 minutes at this temperature. Ice-water was added and the crystalline precipitate was filtered, washed and dried, yielding 19-fluoro-6β-methyl-Δ⁴-10α-pregnene-3,20-dione (Cpd. No. 435).

The Compounds Nos. 254 to 266, inclusive, were treated by the above method, thus furnishing respectively—

Cpd. No.:
- 436. 19-fluoro-6β,16α-dimethyl-Δ⁴-10α-pregnene-3,20-dione
- 437. 19-fluoro-6β,16β-dimethyl-Δ⁴-10α-pregnene-3,20-dione
- 438. 19-fluoro-6β-methyl-16α,17α-isopropylidenedioxy-Δ⁴-10α-pregnene-3,20-dione
- 439. 19-fluoro-6β-methyl-Δ⁴-10α-pregnen-17α-ol-3,20-dione
- 440. 19-fluoro-6β,16α-dimethyl-Δ⁴-10α-pregnen-17α-ol-3,20-dione
- 441. 19-fluoro-6β,16β-dimethyl-Δ⁴-10α-pregnen-17α-ol-3,20-dione
- 442. 19-chloro-6β-methyl-Δ⁴-10α-pregnene-3,20-dione
- 443. 19-chloro-6β,16α-dimethyl-Δ⁴-10α-pregnene-3,20-dione
- 444. 19-chloro-6β,16β-dimethyl-Δ⁴-10α-pregnene-3,20-dione
- 445. 19-chloro-6β-methyl-16α,17α-isopropylidenedioxy-Δ⁴-10α-pregnene-3,20-dione
- 446. 19-chloro-6β-methyl-Δ⁴-10α-pregnen-17α-ol-3,20-dione
- 447. 19-chloro-6β,16α-dimethyl-Δ⁴-10α-pregnen-17α-ol-3,20-dione
- 448. 19-chloro-6β,16β-dimethyl-Δ⁴-10α-pregnen-17α-ol-3,20-dione

*Example LII*

The Compounds Nos. 407 to 448, inclusive, were treated following the procedure described in Example XXXIII thus affording the respective Δ¹,⁴-derivatives.

*Example LIII*

A mixture of 1 g. of 19-fluoro-Δ⁴-10α-pregnene-16α,17α-diol-3,20-dione (Cpd. No. 378), 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded 19-fluoro-Δ⁴-10α-pregnene-16α,17α-diol-3,20-dione-16,17-acetophenonide (Cpd. No. 449).

The Compounds Nos. 379 to 391, inclusive, were treated following the above procedure, thus affording the corresponding 16,17-acetophenonides.

*Example LIV*

A solution of 500 mg. of Compound No. 378 in 20 cc. of chloroform was treated with 1 g. of acetaldehyde and a few drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding 16α,17α-ethylidenedioxy-19-fluoro-Δ⁴-10α-pregnene-3,20-dione (Cpd. No. 450).

The Compounds Nos. 379 to 391, inclusive, were treated according to the latter procedure, thus furnishing the corresponding 16α,17α-ethylidenedioxy derivatives.

*Example LV*

Into a solution of 3 g. of Compound No. 421 in 150 cc. of glacial acetic acid was passed a slow stream of dry hydrogen chloride for 4 hours, while maintaining the temperature around 15° C. The mixture was then poured into ice-water, the precipitate collected, washed with water, dried and recrystallized from acetone-hexane to give a compound identical with Compound No. 295.

*Example LVI*

A mixture of 1 g. of 19-fluoro-Δ⁴-pregnene-16α,17α-diol-3,20-dione (Cpd. No. 154) 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded 19-fluoro-Δ⁴-pregnene-16α,17α-diol-3,20-dione 16, 17-acetophenonide (Cpd. No. 451).

The Compounds Nos. 155 to 167, inclusive, were treated following the above procedure, thus affording the corresponding 16,17-acetophenonides.

*Example LVII*

A solution of 500 mg. of compound No. 154 in 20 cc. of chloroform was treated with 1 g. of acetaldehyde and a few drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding 16α,17α - ethylidenedioxy-19-fluoro-Δ⁴-pregnene-3,20-dione (Cpd. No. 452).

The Compounds Nos. 155 to 167, inclusive, were treated according to the latter procedure, thus furnishing the corresponding 16α,17α-ethylidenedioxy derivatives.

I claim:
1. A compound of the following formula

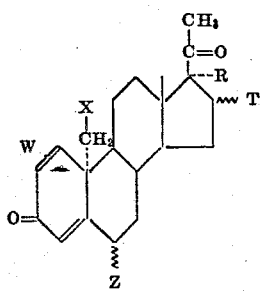

wherein R is selected from the group consisting of hydrogen, hydroxyl and a hydrocarbon carboxylic group of less than 12 carbon atoms; T is a member of the group consisting of hydrogen, α-hydroxyl, α-hydrocarbon carboxylic acyloxy of less than 12 carbon atoms, α-methyl and β-methyl; T and R together represent the group

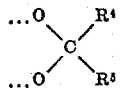

wherein $R^4$ and $R^5$ are selected from the group consisting of hydrogen and a lower hydrocarbon residue of up to 8 carbon atoms; X is selected from the group consisting of fluorine and chlorine; Z is a member of the group consisting of hydrogen, α-methyl, β-methyl, α-fluorine, β-fluorine, α-chlorine and β-chlorine; and W is selected from the group consisting of a saturated linkage between C–1 and C–2 and a double bond between C–1 and C–2.

2. A compound of the following formula:

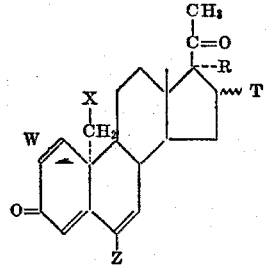

wherein R is selected from the group consisting of hygen, hydroxyl and a hydrocarbon carboxylic acyloxy group of less than 12 carbon atoms; T is a member of the group consisting of hydrogen, α-hydroxyl, α-hydrocarbon carboxylic acyloxy of less than 12 carbon atoms, α-methyl and β-methyl; T and R together represent the group

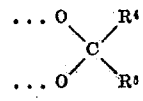

wherein $R^4$ and $R^5$ are selected from the group consisting of hydrogen and a lower hydrocarbon residue of up to 8 carbon atoms; X is selected from the group consisting of fluorine and chlorine; Z is a member of the group consisting of hydrogen, methyl, fluorine and chlorine and W is selected from the group consisting of a saturated linkage between C–1 and C–2 and a double bond between C–1 and C–2.

3. A compound of the following formula:

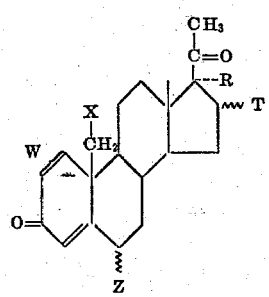

wherein R is selected from the group consisting of hydrogen, hydroxyl and a hydrocarbon carboxylic acyloxy group of less than 12 carbon atoms; T is a member of the group consisting of hydrogen, α-hydroxyl, α-hydrocarbon carboxylic acyloxy of less than 12 carbon atoms, α-methyl and β-methyl; T and R together represent the group

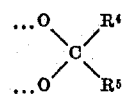

wherein $R^4$ and $R^5$ are selected from the group consisting of hydrogen and a lower hydrocarbon residue of up to 8 carbon atoms; X is selected from the group consisting of fluorine and chlorine; Z is a member of the group consisting of hydrogen, α-methyl, β-methyl, α-fluorine, β-fluorine, α-chlorine and β-chlorine; and W is selected from the group consisting of a saturated linkage between C–1 and C–2 and a double bond between C–1 and C–2.

4. A compound of the following formula:

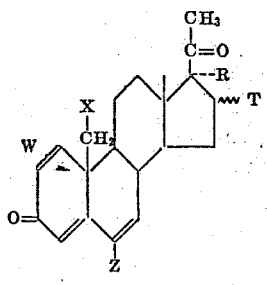

wherein R is selected from the group consisting of hydrogen, hydroxyl and a hydrocarbon carboxylic acyloxy group of less than 12 carbon atoms; T is a member of the group consisting of hydrogen, α-hydroxyl, α-hydrocarbon carboxylic acyloxy of less than 12 carbon atoms, α-methyl and β-methyl; T and R together represent the group

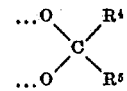

wherein $R^4$ and $R^5$ are selected from the group consisting of hydrogen and a lower hydrocarbon residue of up to 8 carbon atoms; X is selected from the group consisting of fluorine and chlorine; Z is a member of the group consisting of hydrogen, methyl, fluorine and chlorine and W is selected from the group consisting of a saturated linkage between C–1 and C–2 and a double bond between C–1 and C–2.

5. 19-halo-$\Delta^4$-10α-pregnene-3,20-dione wherein halo is a halogen of atomic weight less than 36.

6. 6α-chloro-19-halo-$\Delta^4$-10α - pregnene - 3,20 - dione wherein halo is a halogen of atomic weight less than 36.

7. 6α - chloro - 19-fluoro-16-methyl-$\Delta^4$-10α-pregnene-3,20-dione.

8. 6α,19 - dichloro - 16-methyl-$\Delta^4$-10α-pregnene-3,20-dione.

9. 19-halo - 16 - methyl-$\Delta^4$-10α-pregnene-3,20-dione wherein halo is a halogen of atomic weight less than 36.

10. 19-halo - 16α,17α - isopropylidenedioxy-$\Delta^4$-10α-pregnene-3,20-dione wherein halo is a halogen of atomic weight less than 36.

11. 19 - halo - $\Delta^4$-10α-pregnen-17α - ol-3,20-dione wherein halo is a halogen of atomic weight less than 36.

12. 19 - halo-16 - methyl-$\Delta^4$-10α-pregnen-17α-ol-3,20-dione wherein halo is a halogen of atomic weight less than 36.

13. 19-halo-$\Delta^4$-pregnene-3,20-dione wherein halo is a halogen of atomic weight less than 36.

14. 6α-chloro-19-halo-$\Delta^4$-pregnene-3,20-dione wherein halo is a halogen of atomic weight less than 36.

15. 6α-chloro-19-fluoro - 16-methyl-$\Delta^4$ - pregnene-3,20-dione.

16. 6α,19-dichloro-16-methyl-$\Delta^4$-pregnene-3,20-dione.

17. 19-halo - 16-methyl - $\Delta^4$-pregnene-3,20 - dione, wherein halo is a halogen of atomic weight less than 36.

18. 19-halo - 16α,17α - isopropylidenedioxy-$\Delta^4$-pregnene-3,20-dione wherein halo is a halogen of atomic weight less than 36.

19. 19-halo-$\Delta^4$-pregnene-17α-ol-3,20 - dione wherein halo is a halogen of atomic weight less than 36.

20. 19-halo - 16-methyl-$\Delta^4$-pregnen - 17α-ol-3,20-dione wherein halo is a halogen of atomic weight less than 36.

References Cited by the Examiner
UNITED STATES PATENTS
3,053,858  9/62  Mills _____ 260—397.3

LEWIS GOTTS, *Primary Examiner.*